US010311344B2

(12) United States Patent
Orimoto et al.

(10) Patent No.: US 10,311,344 B2
(45) Date of Patent: *Jun. 4, 2019

(54) PROCESSING APPARATUS, DISPLAY DEVICE AND NON-TRANSITORY COMPUTER READABLE MEDIUM STORING PROGRAM

(71) Applicant: FUJI XEROX CO., LTD., Tokyo (JP)

(72) Inventors: Asae Orimoto, Yokohama (JP); Yusuke Kamoi, Yokohama (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/685,525

(22) Filed: Aug. 24, 2017

(65) Prior Publication Data

US 2017/0351942 A1 Dec. 7, 2017

Related U.S. Application Data

(63) Continuation of application No. 14/295,973, filed on Jun. 4, 2014, now Pat. No. 9,767,393.

(30) Foreign Application Priority Data

Aug. 9, 2013 (JP) .................................. 2013-167134
Aug. 9, 2013 (JP) .................................. 2013-167138

(51) Int. Cl.
*G06F 3/00* (2006.01)
*G06K 15/00* (2006.01)
(Continued)

(52) U.S. Cl.
CPC ......... *G06K 15/005* (2013.01); *G03G 15/502* (2013.01); *H04N 1/00424* (2013.01); *H04N 1/00514* (2013.01)

(58) Field of Classification Search
CPC .... G06F 17/212; G06F 3/1256; G06F 3/1208; G06K 15/005; G03G 15/502; H04N 1/00424; H04N 1/00514
(Continued)

(56) References Cited

U.S. PATENT DOCUMENTS 8,341,696 B2   12/2012 Ogita
8,400,656 B2    3/2013 Inami
(Continued)

FOREIGN PATENT DOCUMENTS

CN   102348039 A   2/2012
CN   103067636 A   4/2013
(Continued)

OTHER PUBLICATIONS

English translation of a communication dated Feb. 6, 2018 from the Japanese Patent Office in counterpart application No. 2014-054321.
(Continued)

*Primary Examiner* — Scott T Baderman
*Assistant Examiner* — Hassan Mrabi
(74) *Attorney, Agent, or Firm* — Sughrue Mion, PLLC

(57) ABSTRACT

A processing apparatus includes: a processing unit that performs a process related to image data; a display unit that displays a process selection portion, with which the process performed by the processing unit is associated and which is selected to start the process by the processing unit; and a creation unit that, in a case of creating the process selection portion to be displayed in the display unit, creates the process selection portion while associating data with the process selection portion.

18 Claims, 25 Drawing Sheets

(51) Int. Cl.
*G03G 15/00* (2006.01)
*H04N 1/00* (2006.01)

(58) Field of Classification Search
USPC .......................................................... 715/274
See application file for complete search history.

(56) References Cited

U.S. PATENT DOCUMENTS

| | | | |
|---|---|---|---|
| 8,656,287 B2 | 2/2014 | Mori | |
| 9,225,861 B2 | 12/2015 | Hwang | |
| 9,291,972 B2 | 3/2016 | Katsumata | |
| 2002/0030855 A1* | 3/2002 | Okuyama | H04N 1/3871 358/1.18 |
| 2002/0152313 A1* | 10/2002 | Nishimura | G06F 9/5027 709/227 |
| 2003/0065531 A1 | 4/2003 | Satomi et al. | |
| 2003/0065585 A1 | 4/2003 | Satomi et al. | |
| 2005/0063006 A1* | 3/2005 | Tsukioka | H04N 1/00222 358/1.15 |
| 2006/0039548 A1 | 2/2006 | Houmura et al. | |
| 2006/0187483 A1 | 8/2006 | Baba | |
| 2007/0277116 A1 | 11/2007 | Nakajima | |
| 2007/0280131 A1 | 12/2007 | Matsuba | |
| 2008/0141148 A1* | 6/2008 | Ogita | H04N 1/00244 715/762 |
| 2008/0239384 A1* | 10/2008 | Kadota | G06F 3/1207 358/1.15 |
| 2009/0198838 A1 | 8/2009 | Murata et al. | |
| 2009/0210788 A1 | 8/2009 | March, Jr. | |
| 2011/0279842 A1* | 11/2011 | Abe | H04N 1/00514 358/1.13 |
| 2012/0026556 A1 | 2/2012 | Katahira | |
| 2013/0074008 A1 | 3/2013 | Umezawa et al. | |
| 2013/0100474 A1 | 4/2013 | Ono | |
| 2013/0305218 A1 | 11/2013 | Hirsch et al. | |
| 2014/0109046 A1 | 4/2014 | Hirsch et al. | |
| 2015/0334254 A1 | 11/2015 | Kinoshita | |

FOREIGN PATENT DOCUMENTS

| | | |
|---|---|---|
| JP | 2001-256124 A | 9/2001 |
| JP | 2004-181775 A | 7/2004 |
| JP | 2005-72922 A | 3/2005 |
| JP | 2005-143035 A | 6/2005 |
| JP | 2006-235957 A | 9/2006 |
| JP | 2006-260544 A | 9/2006 |
| JP | 2007-158720 A | 6/2007 |
| JP | 2007-166016 A | 6/2007 |
| JP | 2007-300500 A | 11/2007 |
| JP | 2007-329785 A | 12/2007 |
| JP | 2009-071414 A | 4/2009 |
| JP | 2009-182765 A | 8/2009 |
| JP | 2010-147669 A | 7/2010 |
| JP | 2010-154039 A | 7/2010 |
| JP | 2013-9067 A | 1/2013 |
| JP | 2013-66031 A | 4/2013 |

OTHER PUBLICATIONS

Communication dated Nov. 16, 2017, issued by the State Intellectual Property Office of People's Republic of China in counterpart Chinese Application No. 201410326900.5.

English Translation of Communication dated Apr. 18, 2017 from the Japanese Patent Office in counterpart application No. 2014-041610.

Translation of communication dated Jul. 4, 2017, from the Japanese Patent Office in counterpart Japanese application No. 2014-054321.

* cited by examiner

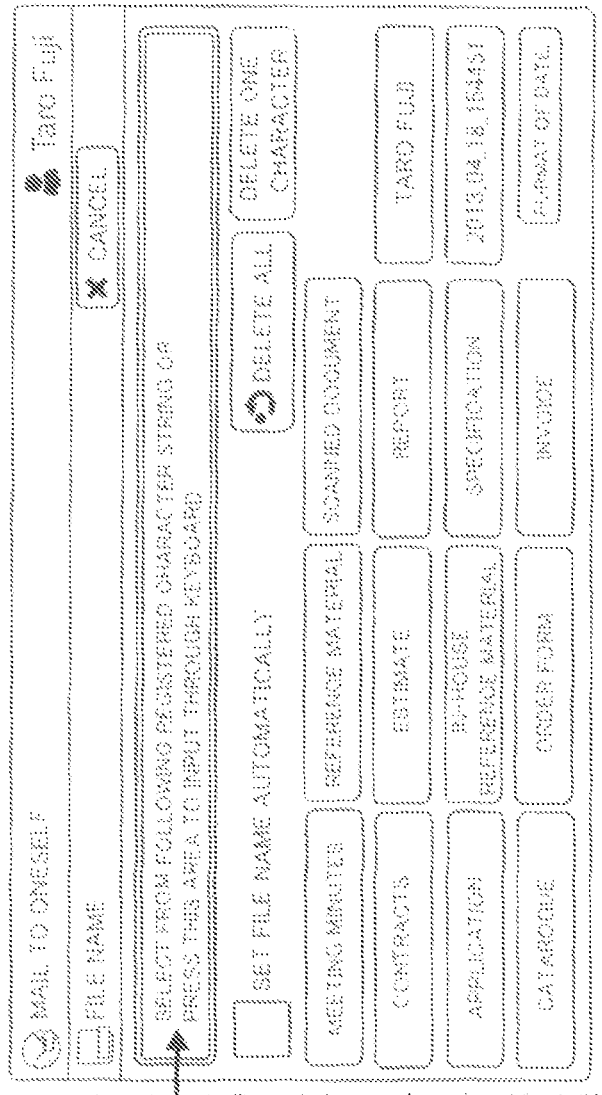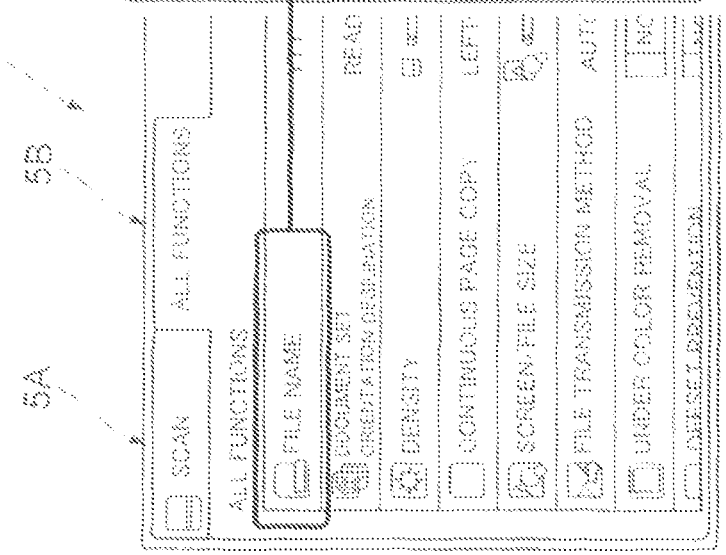

PREVIEW

PROCESSING APPARATUS, DISPLAY DEVICE AND NON-TRANSITORY COMPUTER READABLE MEDIUM STORING PROGRAM

CROSS REFERENCE TO RELATED APPLICATIONS

This application is a Continuation of U.S. patent application Ser. No. 14/295,973, filed on Jun. 4, 2014, which is based on and claims priority under 35 USC § 119 from Japanese Patent Application No. 2013-167134 filed Aug. 9, 2013 and Japanese Patent Application No. 2013-167138 filed Aug. 9, 2013, the disclosures of which are incorporated in their entirety.

BACKGROUND

Technical Field

The present invention relates to a processing apparatus, a display device and a non-transitory computer readable medium storing a program.

Related Art

It is desired for a processing apparatus, display device and non-transitory computer readable medium storing program to be capable of, in creating a process selecting portion to perform a process, registering information related to the process selection portion.

SUMMARY

According to an aspect of the present invention, there is provided a processing apparatus including: a processing unit that performs a process related to image data; a display unit that displays a process selection portion, with which the process performed by the processing unit is associated and which is selected to start the process by the processing unit; and a creation unit that, in a case of creating the process selection portion to be displayed in the display unit, creates the process selection portion while associating data with the process selection portion.

BRIEF DESCRIPTION OF THE DRAWINGS

Exemplary embodiments of the present invention will be described in detail based on the following figures, wherein:

FIGS. 6A and 6B are diagrams showing examples of the display screen when a second tab is selected;

FIGS. 23A and 23B are diagrams showing an example of a display screen displayed on the display part when a warning is issued in a case where a box attribute is changed or the like;

DETAILED DESCRIPTION

First Exemplary Embodiment

Hereinafter, exemplary embodiments according to the present invention will be described with reference to attached drawings.

Figure 1:
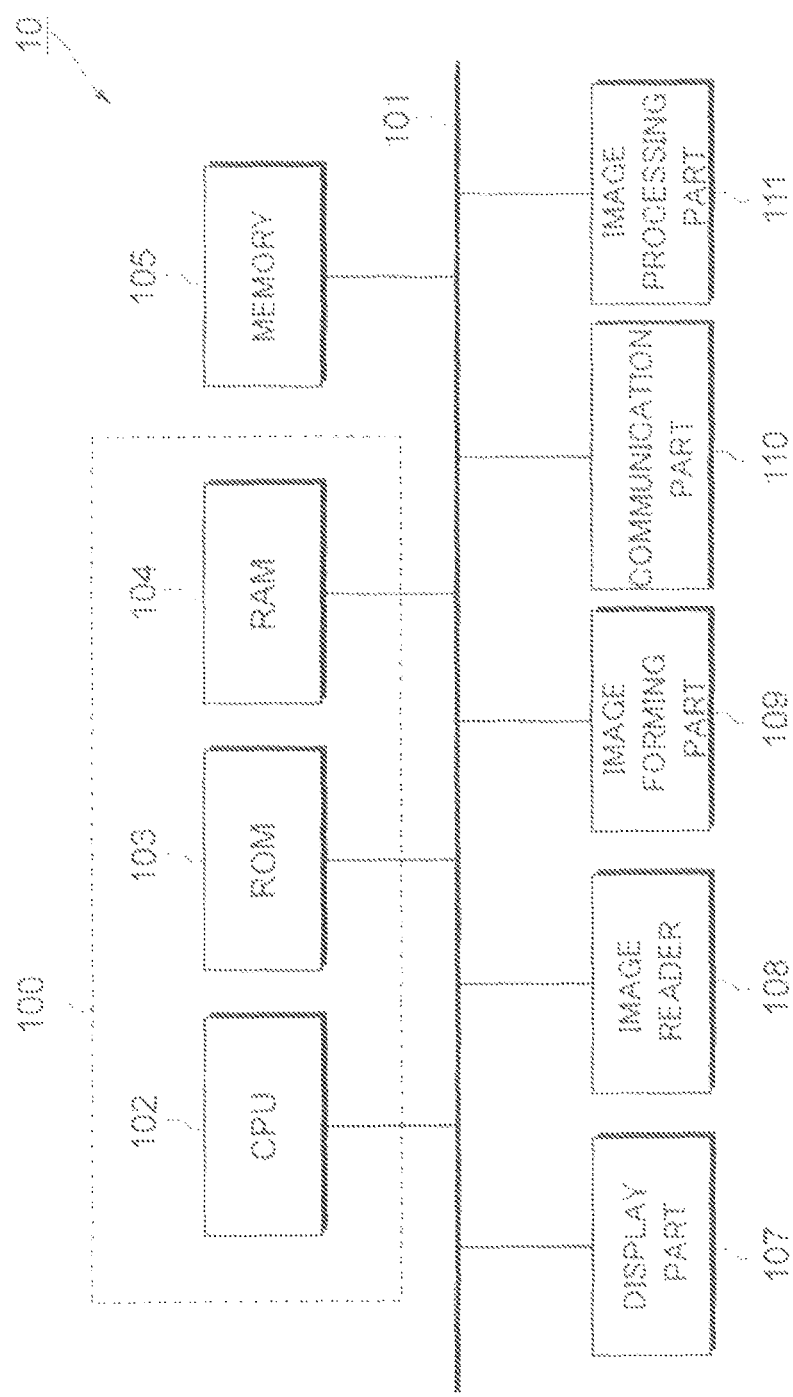
FIG. 1 is a block diagram exemplifying a hardware configuration of an image forming apparatus related to a first exemplary embodiment according to the present invention.

FIG. 1 is a block diagram exemplifying a hardware configuration of an image forming apparatus 10 according to the present invention. The image forming apparatus 10 is provided with a controller 100, a memory 105, a display part 107, an image reader 108, an image forming part 109, a communication part 110 and an image processing part 111. It should be noted that each of these functional parts is connected to a bus 101, and data transmission and reception are performed via the bus 101.

The controller 100 performs control of each of the above-described functional parts provided in the image forming apparatus 10. Here, the controller 100 is configured with a CPU (central processing unit) 102, a ROM (read only memory) 103 and a RAM (random access memory) 104.

The ROM 103 stores a control program executed by the CPU 102. The CPU 102 reads the control program stored in the ROM 103 and executes the control program using the RAM 104 as a work area. When the control program is executed by the CPU 102, each of the functional parts of the image forming apparatus 10 is controlled. Accordingly, for example, predetermined display is performed on the display part 107, or, image formation on a sheet is performed. Moreover, reading of a document set on the image reader 108, etc., is performed.

It should be noted that the program executed by the CPU 102 can be provided in a state of being stored in a computer-readable recording medium, such as a magnetic recording medium (a magnetic tape, a magnetic disk, etc.), an optical recording medium (an optical disk, etc.), a magneto-optical recording medium and a semiconductor memory. Moreover, the program may be downloaded to the image forming apparatus 10 by use of a communication tool such as the Internet.

The display part 107 is configured with, for example, a touch panel display of a liquid crystal and displays data related to, for example, the image forming apparatus 10 under the control of the controller 100. Moreover, the display part 107 displays a display screen for receiving an operation by a user, and receives the operation by the user via the display screen.

The image reader 108 includes an image reading device (a scanner) that reads a document and generates image data representing an image of the read document, and outputs generated image data to the image processing part 111.

The image forming part 109 includes an image forming mechanism that forms a toner image corresponding to the image data onto a recording medium, such as a sheet, by an electrophotographic system or the like.

The communication part 110 is connected to a not-shown communication line, to thereby function as a communication interface performing communications with other devices connected to the communication line.

The image processing part 111 performs image processing such as color correction or halftone correction on the image data to be inputted, and generates image data having been subjected to the image processing and outputs thereof to the image forming part 109.

The memory 105 includes a memory device such as a hard disk device, and stores, for example, data received by the communication part 110 or data generated in the image forming apparatus 10.

Figure 2:
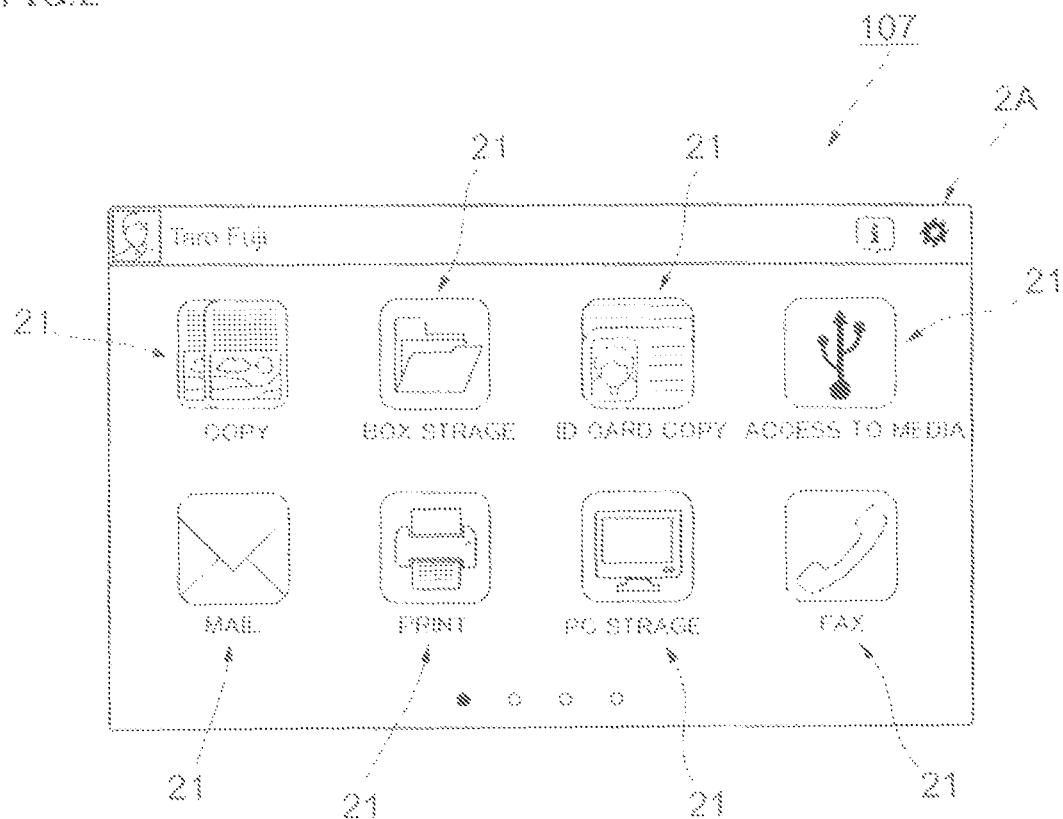
FIG. 2 is a diagram showing a display example in a display part.

FIG. 2 is a diagram showing a display example in the display part 107.

In the display part 107, usually, a home screen shown in the figure is displayed. In the home screen, plural selection buttons (icons) 21 are displayed, and when a user selects (presses) any of the selection buttons 21, a function associated with the selection button 21 is executed.

Specifically, in the example shown in FIG. 2, the selection buttons 21 for selecting any of "copy", "box storage", "ID card copy", "access to media", "mail", "print", "PC storage" and "fax" are displayed as the selection buttons 21. In the exemplary embodiment, when any of these selection buttons 21 is selected by a user, a screen for performing detailed settings is further displayed. Thereafter, by pressing a predetermined button, such as a start button, by the user, a process of copying or the like is started.

It should be noted that, the home screen of the exemplary embodiment is configured with plural pages, and is controlled so that, by pushing out a so-called "background" portion of the display screen shown in FIG. 2, toward the left in the figure while pressing the "background" portion, the display screen is switched to another page. To additionally describe, in the exemplary embodiment, by a so-called flicking operation, switching of pages is executed. It should be noted that, after the page switching is performed, other selection buttons 21 come to appear.

Moreover, in the display part 107 of the exemplary embodiment, it is possible to move each of the selection buttons 21 by operation. Specifically, the selection button 21 can be moved by moving while pressing the selection button 21 by a finger. To additionally describe, in the exemplary embodiment, movement of the selection button 21 is executed by dragging and dropping.

Moreover, in the exemplary embodiment, if any one of the selection buttons 21 is continuously pressed for a predetermined time, or a gear-shaped mark positioned at the top right of the screen (a mark indicated by a reference sign 2A) is pressed in a state where any one of the selection buttons 21 is selected, the screen is switched to enable detailed settings of the function associated with the selection button 21.

Figure 3:
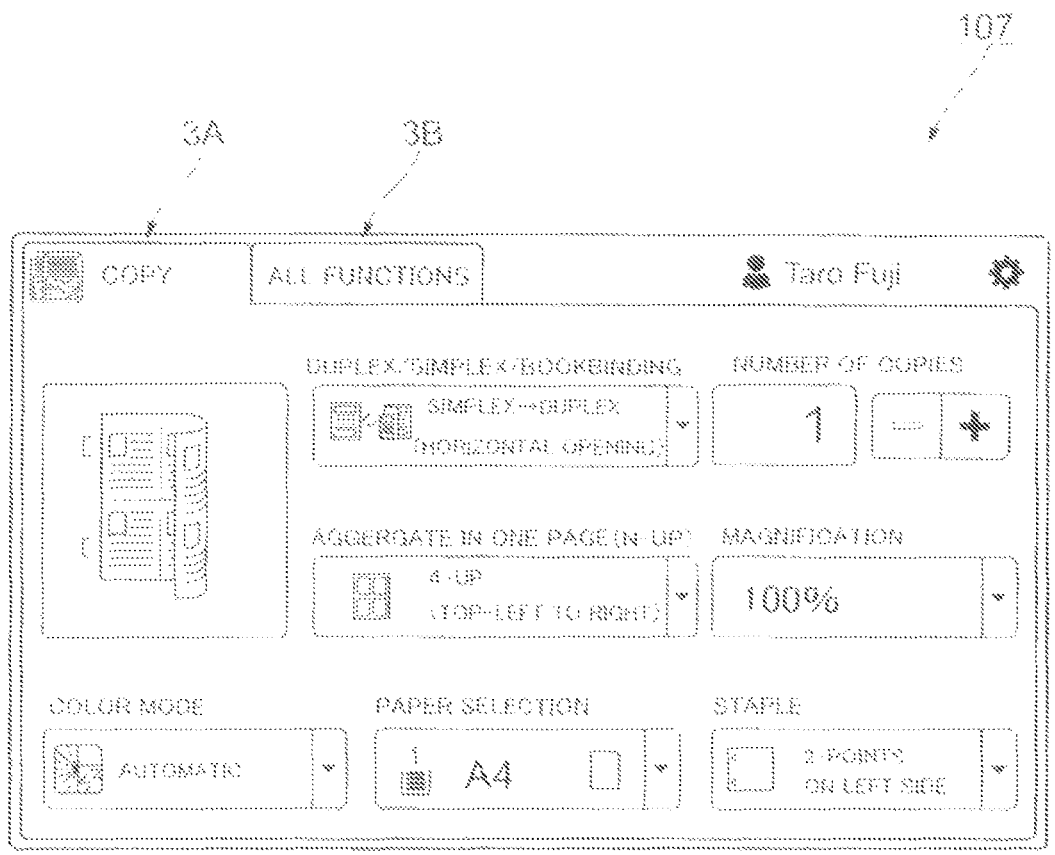
FIG. 3 is a diagram showing an example of a display screen after a selection button "copy" shown in FIG. 2 is selected by a user.

FIG. 3 is a diagram showing a display screen after the selection button 21 for "copy" shown in FIG. 2 is selected (pressed) by a user.

As indicated by reference signs 3A and 3B, the display screen has a configuration provided with two tabs (hereinafter, referred to as "first tab 3A" and "second tab 3B"). If there are only two tabs like this, a button required by the user (a button to be operated) exists in one of the two tabs. Then, the required button necessarily exists if movement between the tabs is once carried out, and accordingly, compared to a case where there are not less than three tabs, such as four or five tabs, the user can reduce the number of times of moving to the tabs until the tab in which the required button (the button to be operated) exists is selected.

To additionally describe, if there are many tabs, it becomes difficult to grasp which function is included in which tab; however, as in the exemplary embodiment, if there are only two tabs, it becomes easy to grasp which function is included in which tab.

Here, in the display part 107, in the state where the first tab 3A is selected, setting items such as "duplex/simplex/bookbinding", "number of copies", "number of N-ups (number of pages aggregated in one page)", "magnification", "color mode", "sheet selection" and "stapling" are displayed as shown in FIG. 3. To additionally describe, in the exemplary embodiment, in the display screen when the first tab 3A is selected, the setting items that are assumed to be relatively and frequently changed by the user are displayed.

Figure 4:
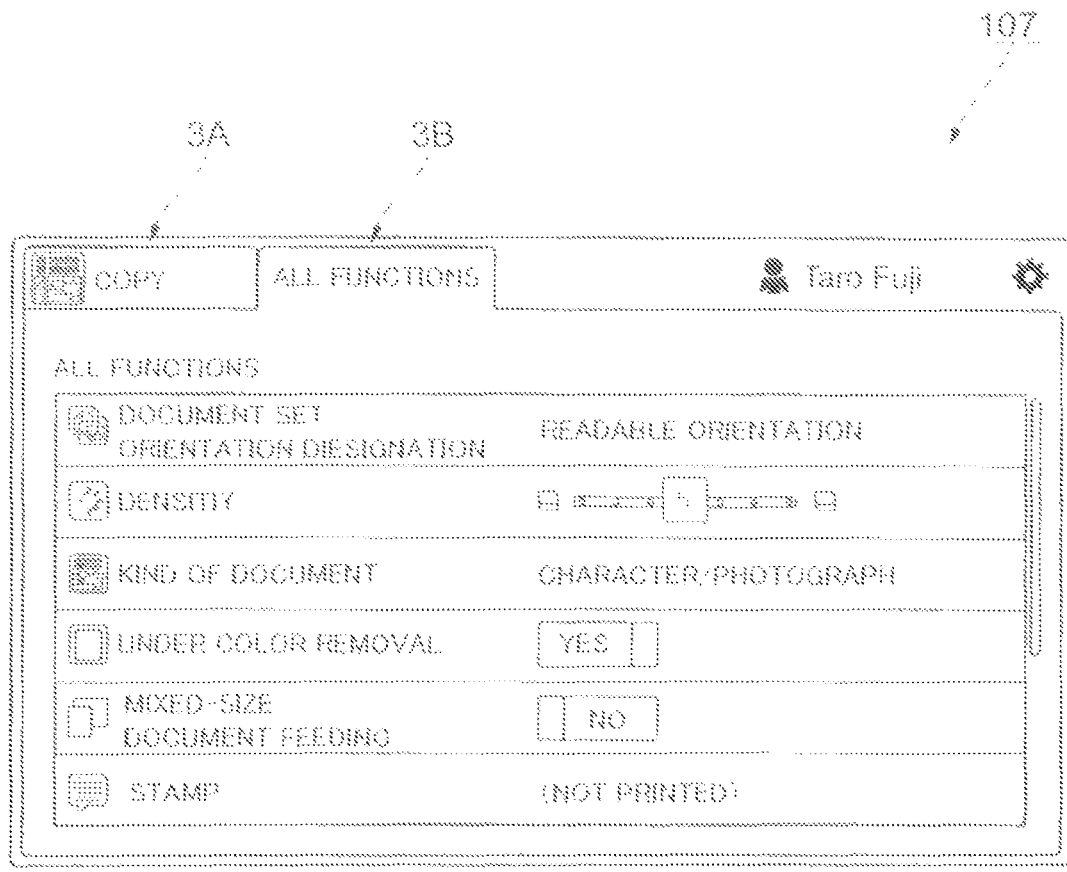
FIG. 4 is a diagram showing a display example in the display part.

On the other hand, in the exemplary embodiment, with respect to the setting items that are not assumed to be relatively and frequently changed by the user, as shown in FIG. 4 (a diagram showing a display example in the display part 107), display is performed in a display screen when the second tab 3B is selected.

Here, in the display screen shown in FIG. 4, the setting items (the items to be set by the user) are arranged in the vertical direction of the screen to be displayed. To additionally describe, the setting items are displayed in a form of a list. It should be noted that, in the display screen shown in FIG. 4, hidden setting items are displayed by scrolling in a downward direction in the figure.

Here, in the display screen when the second tab 3B is selected, by scrolling in a single direction (the downward direction in the figure), other setting items are also displayed. This allows the user to easily find a setting item which he/she seeks.

Here, for example, it is also considered that the setting items are displayed in the forms of buttons, and are arranged in a lattice shape; however, in this case, the user is required to turn his/her eyes not only in the vertical direction, but also in the horizontal direction. In such a case, as compared to the case where the setting items are displayed by scrolling in one direction as in the exemplary embodiment, the user has a difficulty in finding a setting item which he/she seeks.

Figure 5:
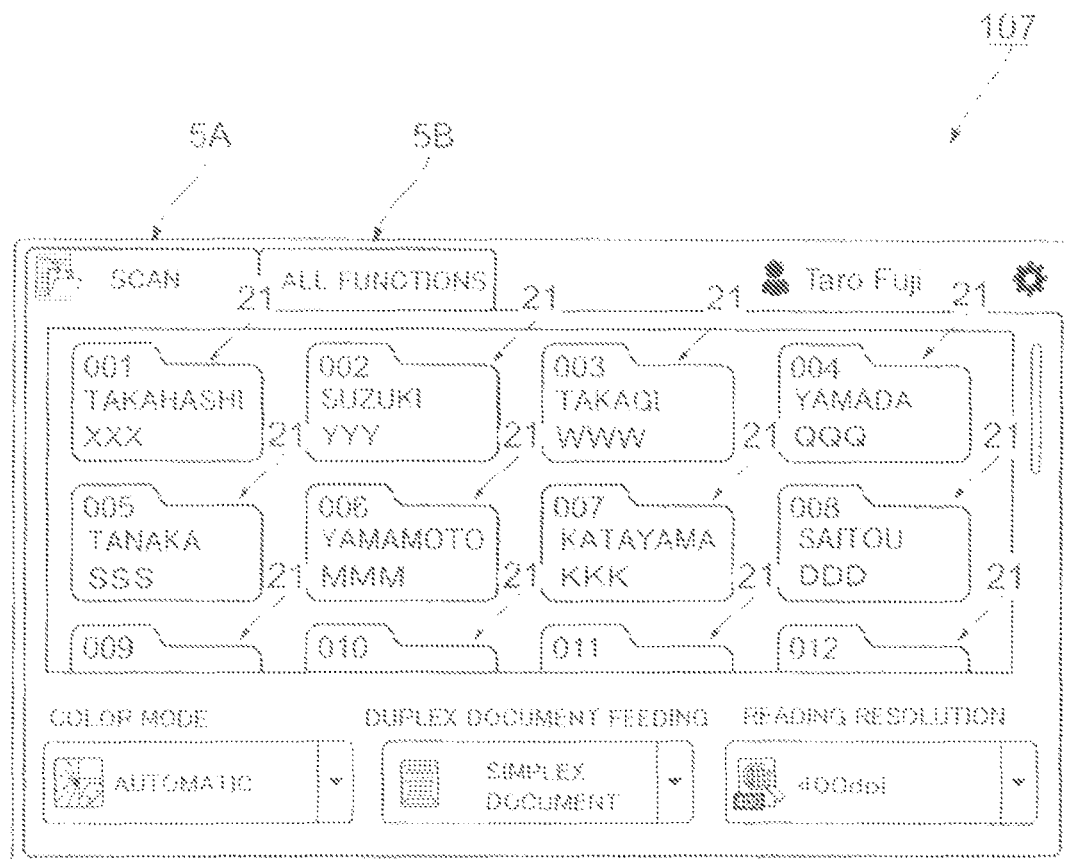
FIG. 5 is a diagram showing an example of the display screen when a selection button "box storage" on a home screen shown in FIG. 2 is selected.

FIG. 5 is a diagram showing a display screen when the selection button "box storage" on the home screen shown in FIG. 2 is selected.

When "box storage" on the home screen is selected, the home screen is switched to the display screen that is assigned a user's name, in which plural selection buttons 21 are displayed, as shown in FIG. 5. Similar to the display screen described above, this display screen has a configuration provided with two tabs (hereinafter, referred to as "first tab 5A" and "second tab 5B").

It should be noted that FIG. 5 shows a state where the first tab 5A is selected. Moreover, the exemplary embodiment is configured so that, when the display screen is switched by selection of "box storage", first, the first tab 5A is displayed. Then, in the exemplary embodiment, by user's selection of the second tab 5B separately, the display screen corresponding to the second tab 5B is displayed.

Here, the box storage refers to a process that stores image data generated by reading a document by use of the image reader 108 in the memory 105. At that time, by selecting any one of the selection buttons 21 shown in FIG. 5 by the user, a storing destination is designated, and the image data is stored in the storing destination.

It should be noted that, until selection of the storing destination is carried out, each of the selection buttons 21 shown in FIG. 5 is in an off state (having a color substantially the same as the color of "background"), and when selection of the storing destination is carried out, the color of the button is changed to another color to be switched to the on state (becomes the selected state).

Moreover, in the display screen shown in FIG. 5, in the lowermost portion of the screen, the setting items frequently changed by the user ("color mode", "document feeding mode" and "reading resolution") are displayed, and these setting items are configured so that the contents thereof can be changed without switching the screen (without selecting the second tab 5B).

FIGS. 6A and 6B are diagrams showing the display screens when the second tab 5B is selected.

As shown in FIG. 6A, in the case where the second tab 5B is selected, other setting items capable of being set in performing the box storage are displayed. It should be noted that, in this case also, the setting items similar to those described above are displayed in a form of a list. Here, in the exemplary embodiment, it is possible to assign a file name to every document read by the image reader 108. Moreover, in the exemplary embodiment, when the setting item "file name" in FIG. 6A is selected, a display screen for inputting a file name is displayed as shown in FIG. 6B. In the exemplary embodiment, the user inputs a desirable file name via the display screen.

Next, personal print will be described.

In the personal print, image data generated by a PC (personal computer) owned by a user is transmitted to the image forming apparatus 10, and is temporarily stored in the memory 105 (refer to FIG. 1) of the image forming apparatus 10. Then, the user inputs a starting instruction via the display part 107, to thereby start image formation onto a sheet.

In the personal print, since image formation is carried out in a state where the user is in the immediate neighborhood of the image forming apparatus 10, the user is able to obtain printed matter immediately after the printed matter is printed. In such a case, it rarely happens that a person other than the user obtains the printed matter.

Here, when the personal print is carried out, the home screen shown in FIG. 2 is operated, the selection button for "personal print" (not shown in FIG. 2) is selected by the user. When the selection button for "personal print" is selected, the home screen is switched to the display screen shown in FIG. 7 (a diagram showing a display screen after "personal print" is selected).

Figure 7:
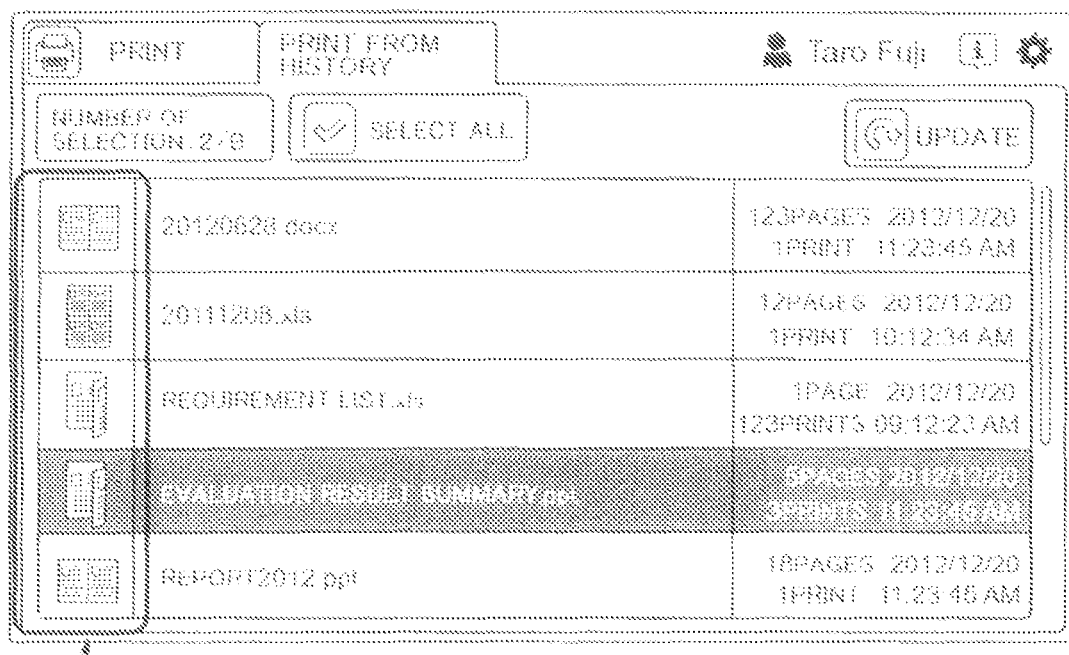
FIG. 7 is a diagram showing an example of the display screen after "personal print" is selected.

Here, in the display screen after switching shown in FIG. 7, file names of plural pieces of image data (print jobs) stored in the memory 105 are displayed in a form of a list. To additionally describe, file names are displayed in a state of being arranged in the vertical direction. Moreover, at the left of the file name in the figure, a preview screen indicating a state of a printed sheet is displayed.

Figure 8:
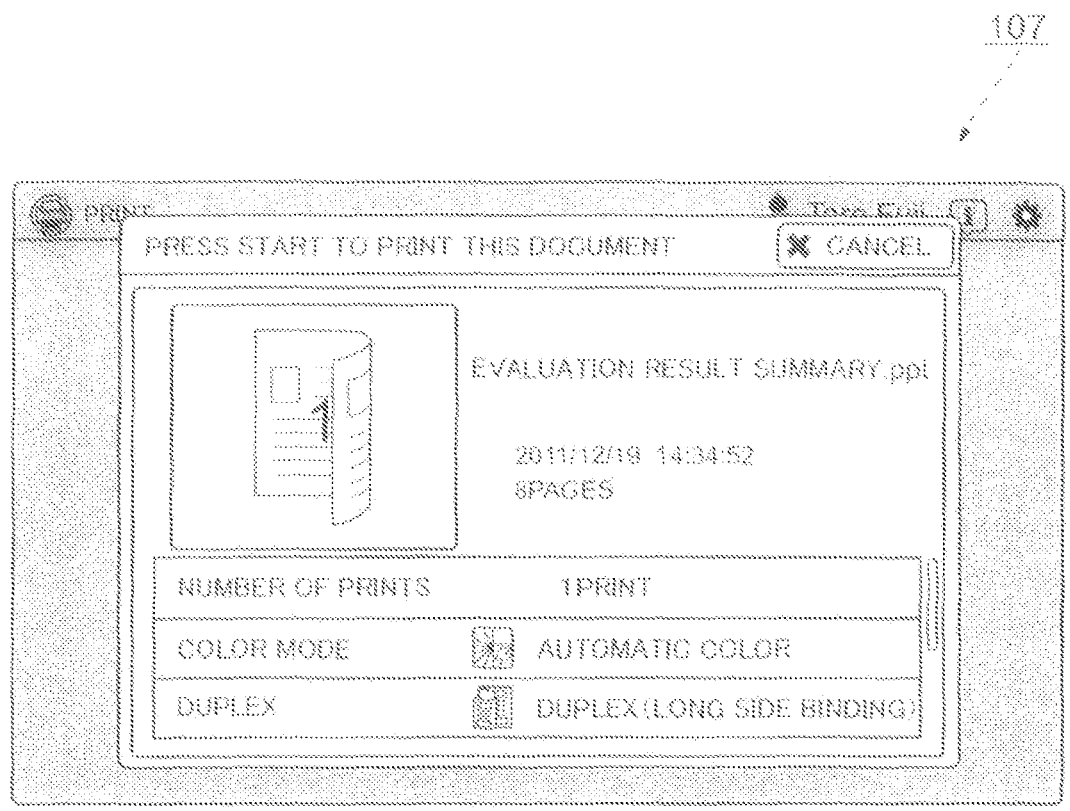
FIG. 8 is a diagram showing an example of the display screen after a file is selected.

Here, when one of the plural files shown in FIG. 7 is selected, the display screen is switched to a screen shown in FIG. 8 (a diagram showing a display screen after a file is selected). Here, in the display screen, setting items are displayed in a lower half of the screen. Specifically, in this specific example, three setting items, namely, "number of prints", "color mode" and "whether duplex printing is needed" are displayed.

Further, at the top right of the display screen, a file name is displayed, and at the top left of the display screen, a preview screen indicating a state of a printed sheet is displayed. It should be noted that, in the exemplary embodiment, each of the above-described three setting items can be changed in the display screen shown in FIG. 8, and when the change is carried out, the preview screen is also changed in accordance with the change. That is, in the exemplary embodiment, the preview screen is dynamically changed in accordance with the change of the setting item.

Here, in the exemplary embodiment, the files are displayed in the form of a list in this manner, and the user selects the file to be printed. Then, the selected file is printed.

It should be noted that, though illustration is omitted, in the exemplary embodiment, a selection button 21 for "personal batch print" is prepared on the home screen, and when this selection button 21 is pressed, batch printing of not-yet-outputted accumulated documents is carried out by a one-touch operation (without performing other input operations). To additionally describe, with regard to the personal print, the exemplary embodiment has a form in which two kinds of selection buttons 21, namely, "personal print (displayed in a list)" and "personal batch print" are prepared.

Incidentally, in the image forming apparatus 10 in the exemplary embodiment, other than the selection buttons 21 having already been prepared, a user is able to create a new selection button 21. To additionally describe, in the exemplary embodiment, it is possible to create a selection button 21 that starts a process by a single selection (by performing a single input operation, not performing plural times of input operations) of the selection button 21 (hereinafter, referred to as "one-touch selection button 21"). It should be noted that a selection button 21 for the above-described "personal batch print" corresponds to the one-touch selection button 21.

Figure 9A:
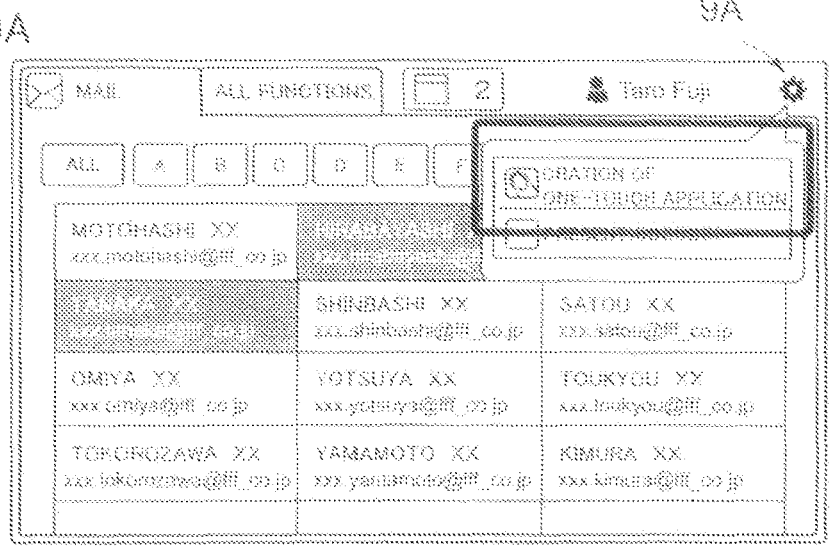
FIGS. 9A to 9C are diagrams showing the display screen when a user creates a one-touch selection button.

Here, when the one-touch selection button 21 is created by a user, in FIG. 9A (a diagram showing a display screen when a user creates the one-touch selection button 21), the gear-shaped mark (the mark indicated by the reference sign 9A) positioned at the top right of the screen is pressed by the user. To additionally describe, FIG. 9A shows a state after the selection button 21 for "mail" shown in FIG. 2 is selected and the display screen is switched.

Figure 9B:
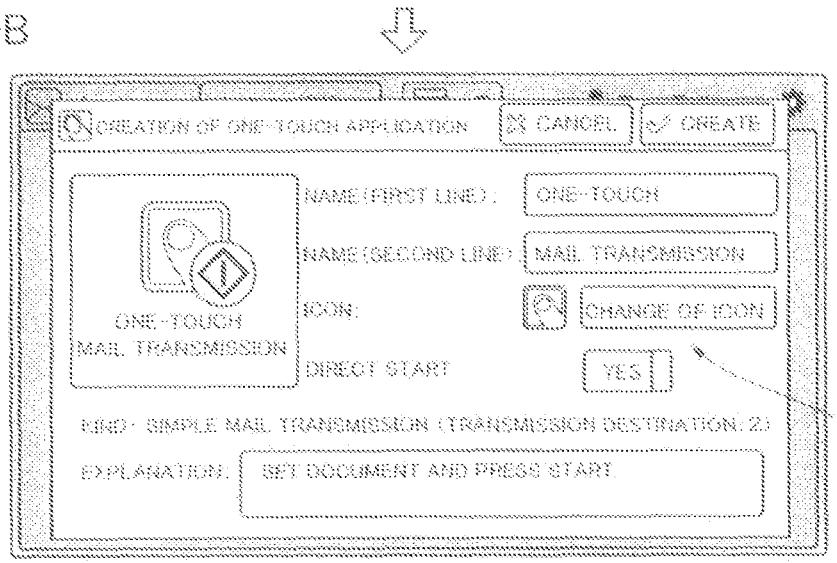

Here, when the gear-shaped mark 9A is pressed, a display screen shown in FIG. 9B is displayed. In the display screen, information required to create the one-touch selection button 21 is inputted by the user. Specifically, "name (first line)" and "name (second line)" are inputted by the user. Here, in the one-touch selection button 21 (the created one-touch selection button 21) in the exemplary embodiment, a name is represented in two stages. "Name (first line)" shows a name displayed in an upper stage of the two stages, whereas, "name (second line)" shows a name displayed in a lower stage of the two stages.

Figure 10:
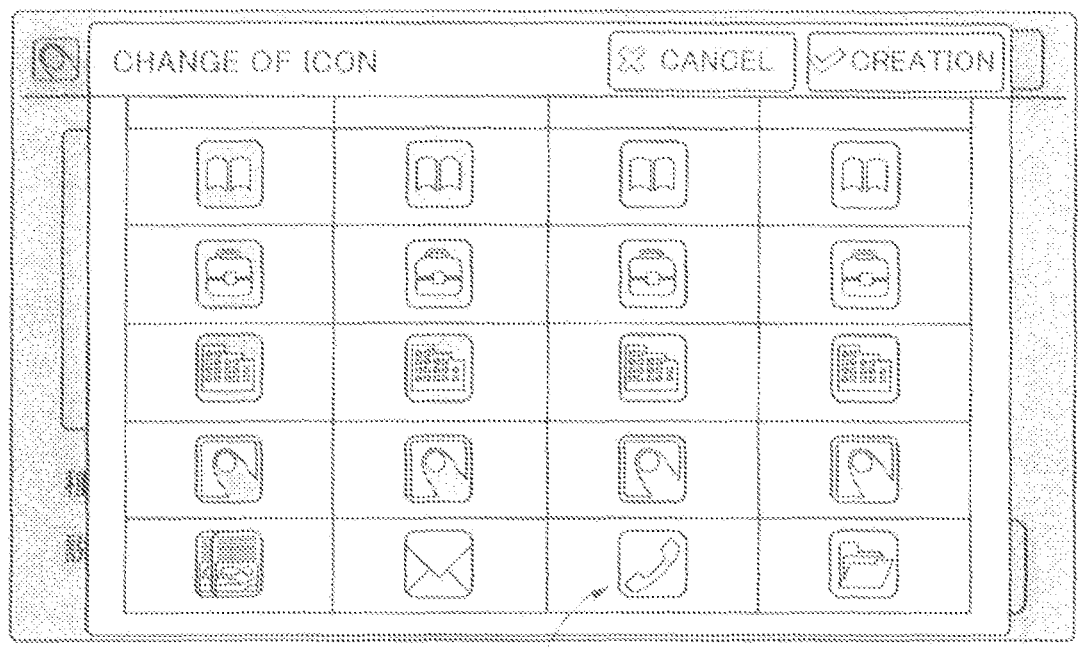
FIG. 10 is a diagram showing an example of a list of the one-touch selection buttons.

Further, in the display screen shown in FIG. 9B, a button that is pressed by a user in changing a design (an icon) of the one-touch selection button 21 is also displayed (refer to reference sign 9B). When this button is pressed by the user, a screen shown in FIG. 10 (a screen showing a list of one-touch selection buttons 21) is displayed, and by user's selection of a one-touch selection button 21 from the screen, the selected one-touch selection button 21 is registered as a new one-touch selection button 21. Moreover, in the exemplary embodiment, a user is able to register explanations, and a user who wants to register explanations inputs the explanations within a box positioned at a lower portion of the display screen (the display screen shown in FIG. 9B).

Figure 9C:
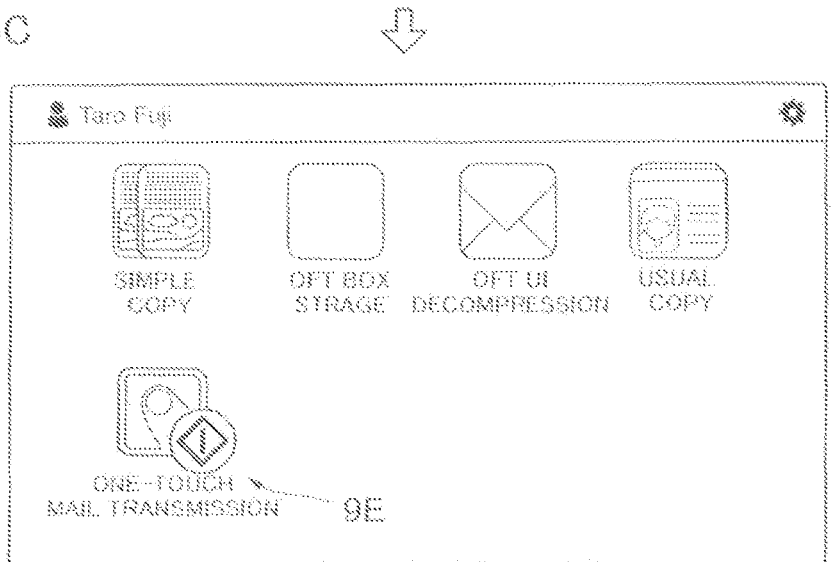

Here, when input by the user to the display screen shown in FIG. 9B is completed, a button called "creation" positioned at the top right of the screen is pressed by the user. Consequently, a display is switched to a screen shown in FIG. 9C, and a one-touch selection button 21 named "one-touch mail transmission" is added to the display screen (the home screen).

It should be noted that, here, the process of creating the one-touch selection button 21 has been described; however, in the exemplary embodiment, a user is able to create a one-touch selection button 21 which executes a process by selecting the one-touch selection button 21 to display a confirmation screen, and by inputting a start button. It should be noted that the one-touch selection button 21 and the ordinary selection button 21 are configured to be distinguishable on the display screen, and the one-touch selection button 21 is provided with a rhombus-shaped mark as indicated by a reference sign 9E in FIG. 9C. In the exemplary embodiment, the start button for executing a process after displaying a confirmation screen is arranged at other location, which is not shown, in the image forming apparatus, not on the display screen.

It should be noted that, so far, description has been given of the display process in the image forming apparatus 10; however, the display process is able to be executed in a similar way in apparatuses other than the image forming apparatus 10 (for example, an apparatus such as a tablet).

Subsequently, the process of creating the selection button 21 (the one-touch selection button 21 or the selection button 21 for displaying the confirmation screen) will be described in more detail.

Figure 11:
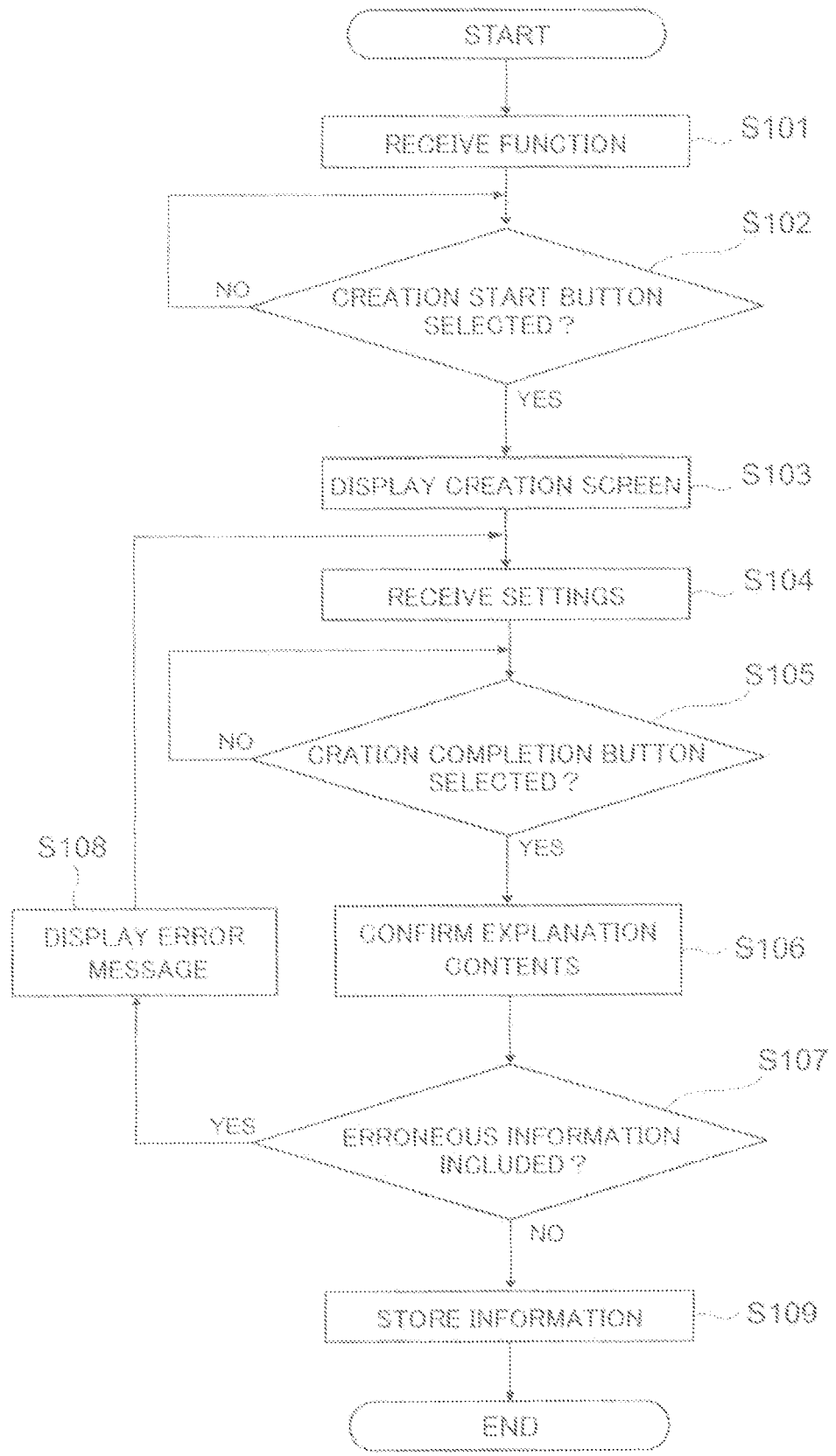
FIG. 11 is a flowchart showing an example of a process executed by a controller when the one-touch selection button is created.

FIG. 11 is a flowchart showing a process executed by the controller 100 (refer to FIG. 1) when the selection button 21 is created.

In this specific example, description will be given by taking a case of creating a selection button 21 related to a fax transmission function as an example.

As shown in FIG. 11, when a selection button 21 is to be newly created, the controller 100 receives an input about a function (a process) to be associated with the selection button 21 to be newly created from a user (step 101).

Specifically, when the selection button 21 is newly created, the user selects (presses) a selection button 21 representing the function to be associated with the selection button 21 to be newly created on the home screen shown in the above-described FIG. 2. In this example, the user first selects a selection button for "fax" on the home screen shown in FIG. 2 described above.

If the selection button 21 is pressed on the home screen, the screen for performing settings about the selected function, which is as shown in FIGS. 3 to 6A and 6B described above, is displayed on the display part 107 by the controller 100.

In this example, also in the case where the selection button 21 for "fax" is selected, the screen for performing settings about the fax function is similarly displayed on the display part 107 by the controller 100. Though detailed description is omitted here, similar to the screen for performing settings about the copy function shown in FIGS. 3 and 4 or the screen for performing settings about the box storage function shown in FIGS. 5, 6A and 6B, the screen for performing settings about the fax function also has a configuration provided with a first tab for displaying setting items that are frequently changed by the user and a second tab for displaying all the setting items in a form of a list.

Then, the user performs settings of each item related to the function associated with the selection button 21 to be newly created by use of the screen displayed in the display part 107. For example, in the case where the copy function is selected, settings, such as "duplex/simplex/bookbinding", "number of copies", "number of N-ups (number of pages aggregated in one page)", "magnification" and "color mode", are performed. Moreover, in the case where the box storage function is selected, settings, such as "color mode", "document feeding mode" and "reading resolution", are performed.

Further, in the case where the fax function is selected, settings, such as "transmission destination", "image quality" and "magnification", are performed. It should be noted that, with respect to "transmission destination", it is possible to set one or more transmission destinations in creating a single selection button 21; however, in this example, it is assumed that a single transmission destination is set by the user.

Subsequently, the controller 100 determines whether or not a button for starting creation of a selection button 21 (the gear-shaped mark indicated by the reference sign 9A in FIG. 9A, hereinafter referred to as a creation start button 9A) is selected by a user (step 102).

It should be noted that, if the creation start button 9A is not selected (NO in step 102), the controller 100 waits until the creation start button 9A is selected.

Next, in the case where it is determined that the creation start button 9A is selected (YES in step 102), the controller 100 causes the display part 107 to display a display screen for confirming and changing the contents of settings of the selection button 21 to be newly created (hereinafter referred to as a selection button creation screen, or simply referred to as a creation screen) (step 103).

Figure 12:
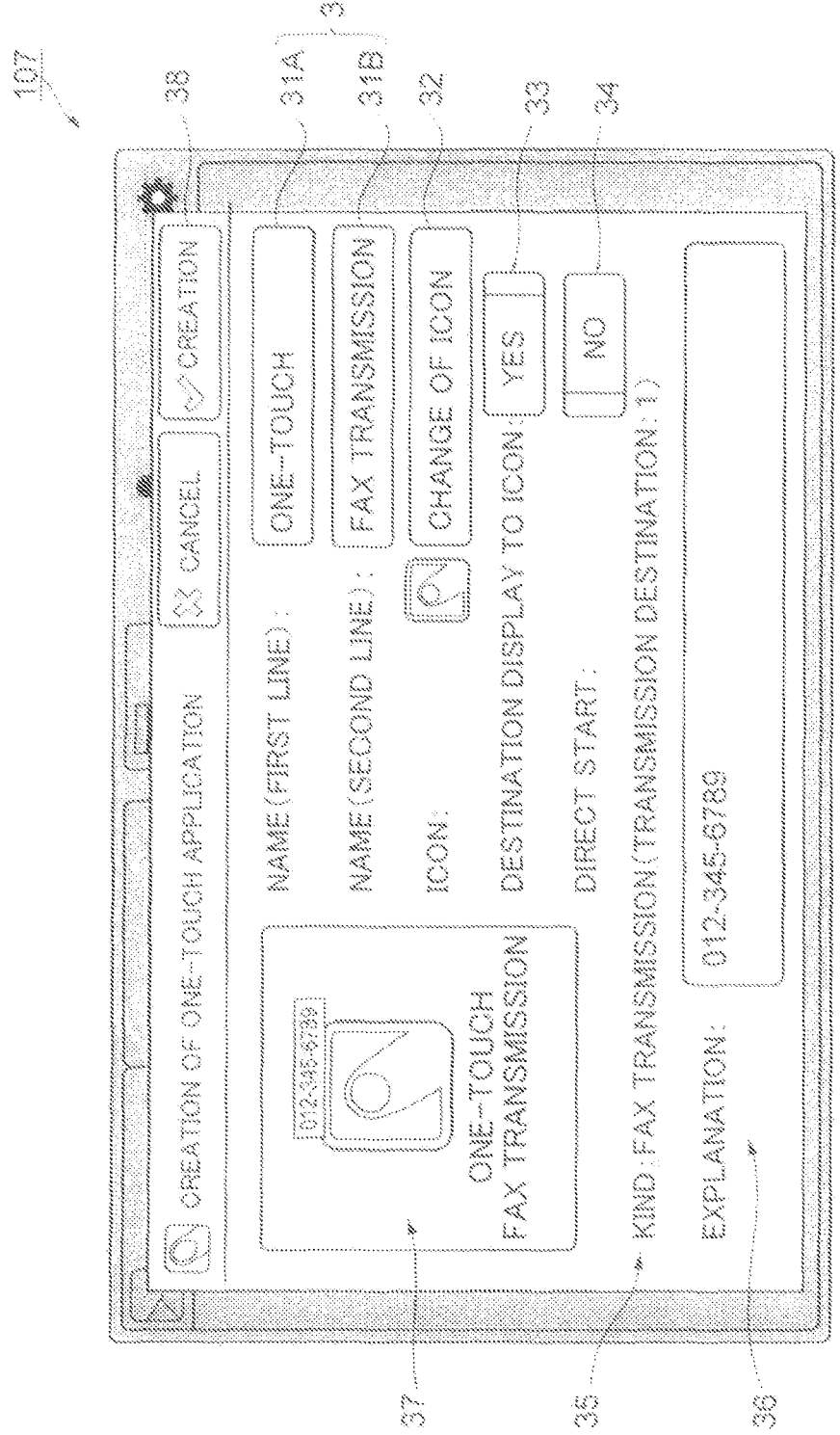
FIG. 12 is a diagram showing a display screen in a default state displayed on the display part in step 103.

Specifically, the controller 100 causes the display part 107 to display a creation screen corresponding to the function or setting items associated with the selection button 21 to be newly created, which has been inputted by the user in step 101. In this example, as shown in FIG. 12, which will be described later, a creation screen corresponding to the fax function selected in step 101 is displayed on the display part 107.

Subsequently, the controller 100 receives inputs, such as changes in the setting contents related to the selection button 21 to be newly created, in the creation screen (step 104).

It should be noted that the details of the creation screen displayed on the display part 107 in step 103 or the process in the case where the inputs, such as changes in the setting contents, via the creation screen in step 104 will be described in detail later.

Next, the controller 100 determines whether or not a creation completion button 38 (refer to FIG. 12 to be described later) that is displayed in the creation screen for completing creation of the selection button 21 has been selected by the user (step 105).

It should be noted that, in the case where the creation completion button 38 has not been selected yet (NO in step 105), the controller 100 waits until the creation completion button 38 is selected.

If it is determined that the creation completion button 38 has been pressed (YES in step 105), the controller 100 confirms, of the various settings received in step 104, contents of the explanations inputted by the user (step 106) and determines whether or not erroneous information is included in the contents of the explanations (step 107). It should be noted that details of the explanations and confirmation of contents of the explanations will be described later.

In the case where it is determined that the erroneous information is included in the contents of the explanations (YES in step 107), the controller 100 causes the display part 107 to display an error message for suggesting that there is a problem in the contents of the explanations to the user (step 108), and returns to step 104 to continue the process, while prompting the user to correct the contents of the explanations.

On the other hand, if it is determined that the erroneous information is not included in the contents of the explanations (NO in step 107), the controller 100 causes the memory 105 to store the information, input of which is received in step 101 or step 104, as information related to the selection button 21 to be created (step 109).

With the above description, creation of the selection button 21 is completed.

It should be noted that, in the case where it is determined that the no erroneous information is included in the explanations (NO in step 107), the controller 100 switches the display screen of the display part 107 to the above-described home screen (refer to FIG. 2). Then, the newly created selection button 21 created by the above-described steps is added to the home screen (refer to FIG. 9C and FIG. 14 to be described later).

Subsequently, details of the creation screen of the one-touch selection button will be described.

FIG. 12 is a diagram showing a display screen (a creation screen of the selection button) in a default state displayed on the display part 107 in step 103 described above.

In the creation screen of the selection button, buttons or boxes for allowing a user to input information required by the user to create the selection button 21 are displayed.

The creation screen of the selection button shown in FIG. 12 includes: a name box 31 (a first line 31A and a second line 31B); an icon change button 32 for changing the name of the selection button 21 to be created. (corresponding to the button indicated by the reference sign 9B in FIG. 9B); a destination display selection button 33 for selecting whether or not destinations are displayed in the icon of the selection button 21 to be created; and a one-touch operation selection button 34 to select the selection button 21 to be created from the one-touch selection button 21 and the selection button 21 for displaying the confirmation screen.

Further, the creation screen of the selection button includes: a kind display part 35 for displaying a kind of a function associated with the selection button 21 to be created; an explanation box 36 for inputting explanations related to the selection button 21 to be created; a preview display part 37 for displaying a state of the selection button 21 to be created when the selection button 21 is displayed on the home screen; and the creation completion button 38 for completing creation of the selection button 21.

Here, as described above, the name box 31 is a box for inputting a name to be displayed on the display screen (the home screen) together with the icon of the selection button 21, and is divided into two lines, namely, the first line 31A and the second line 31B.

In the exemplary embodiment, in the name box 31 in a default state that is initially displayed by the controller 100 on the display part 107 when the creation start button 9A is selected in step 102, a name related to the function inputted in step 101 is automatically entered in advance. In this example, corresponding to the fax function inputted in step 101, "one-touch" is automatically inputted in the first line 31A, and "fax transmission" is automatically inputted in the second line 31B of the name box 31.

In the exemplary embodiment, a user is able to change the name inputted in the name box 31. Specifically, when the user presses the name box 31 (the first line 31A and the second line 31B), a keyboard screen (not shown) is displayed on the display part 107 by the controller 100. The user is able to input an arbitrary name to the name box 31 by use of the displayed keyboard. At this time, the user is able to correct the character strings automatically inputted to the name box 31 by the controller 100.

The icon change button 32 is a button selected by a user when the icon of the selection button 21 to be created is changed. Moreover, on the left side in the figure of the icon change button 32, an icon that is presently set is displayed. In the exemplary embodiment, in the default state initially displayed on the display part 107, an icon predetermined by the controller 100 is set, and is displayed on the left side in the figure of the icon change button 32.

When the icon change button 32 is selected by the user, an icon selection screen in which plural icons are arranged (refer to FIG. 10) is displayed on the display part 107 by the controller 100. Then, by selecting an icon from the icon selection screen, the user is able to change the icon of the selection button 21 to be created.

The destination display selection button 33 is a slide-type button having a knob that is movable to the right or left, and is able to make selection between "YES" and "NO" by sliding the knob to the right or left.

It should be noted that the destination display selection button 33 is displayed in the case where, for example, the function selected in step 101 includes a function of transferring data (facsimile transmission or mail transmission) to the outside of the image forming apparatus 10 (refer to FIG. 1).

In the case where "YES" is selected on the destination display selection button 33, information regarding the destination of the function associated with the selection button 21 is displayed together with the icon of the selection button 21 displayed on the home screen.

It should be noted that, in the exemplary embodiment, in the default state of the creation screen initially displayed on the display part 107, the destination display selection button 33 is set as "YES". Consequently, in the case where the user does not operate the destination display selection button 33, the destination is displayed together with the icon of the selection button 21. As a result, as long as the user does not carry out an operation of changing the setting to "NO" in the creation screen, the destination is set to be notified to the user, and accordingly, it is possible to suppress occurrence of erroneous transmission, such as transmitting data to an unintended destination, as compared to the case where the destination display selection button 33 is set to "NO" in the creation screen in the default state.

The one-touch operation selection button 34 is, similar to the destination display selection button 33, configured with a slide-type button, it is possible to make a selection between "YES" and "NO" by sliding the knob to the right or left.

Here, in the case where "YES" is selected on the one-touch operation selection button 34, the selection button 21 to be created becomes "one-touch selection button 21" that starts a process by only a single selection of the selection button 21. In this case, as described above, the icon of the selection button 21 displayed on the home screen is provided with the rhombus-shaped mark (the reference sign 9E, refer to FIG. 9C).

On the other hand, in the case where "NO" is selected on the one-touch operation selection button 34, the selection button 21 to be created becomes "selection button 21 for displaying confirmation screen". In this case, the rhombus-shaped mark 9E is not added to the icon of the selection button 21 displayed on the home screen.

It should be noted that, different from the one-touch selection button 21, the selection button 21 for displaying the confirmation screen is a selection button 21 that does not start a process by a single inputting operation (one touch). In other words, in the case where the selection button 21 for displaying the confirmation screen is selected on the home screen, prior to executing a process associated with the selection button 21 for displaying the confirmation screen, the confirmation screen for confirming the setting contents of the function associated with the selection button 21 for displaying the confirmation screen is displayed on the display part 107. Thereafter, in the case where, for example, execution of the process is finalized by the user, the process is started.

Here, in the exemplary embodiment, in the creation screen in the default state initially displayed in the display part 107, the one-touch operation selection button 34 is set to "NO". Consequently, if the user does not carry out an operation on the one-touch operation selection button 34, the selection button 21 to be created becomes "selection button 21 for displaying confirmation screen". As a result, the setting is made so that, as long as the user does not carry out changing to "YES" in the creation screen, the selection button 21 to be created does not become the one-touch selection button 21. Accordingly, it is possible to suppress unintentional creation of "one-touch selection button 21", and also suppress execution of an unintentional process caused by erroneous selection of the one-touch selection button 21 by the user, as compared to the case where "YES" is set in the default state.

The kind display part 35 displays a kind of the function associated with the selection button 21 to be created. The contents displayed in the kind display part 35 are set by the controller 100 in accordance with the function selected in step 101, and are incapable of being changed by a user.

As described above, since it is possible for a user to change the icon or name of the selection button 21 to be created, there are some cases in which the icon or name of the selection button 21 is changed by a user to those irrelevant to the selected function. In this case, by watching icons or names irrelevant to the function in selecting the function, there is a possibility that a user has a false perception regarding the function associated with the selection button 21. Consequently, in the exemplary embodiment, the kind of the function associated with the selection button 21 is displayed in the kind display part 35 for suppressing occurrence of such inconveniences.

In the example shown in FIG. 12, the characters "fax transmission" corresponding to the fax function selected in step 101 and "(transmission destination: 1)" corresponding to the number of transmission destinations set in step 104 are displayed in the kind display part 35 by the controller 100.

The explanation box 36 is a box for inputting explanations regarding the selection button 21 to be created. A user is able to input arbitrary explanations to the explanation box 36. Specifically, when a user presses the explanation box 36, a keyboard screen (not shown) is displayed on the display part 107 by the controller 100. The user is able to input explanations by use of the keyboard. Then, the controller 100 displays the explanations in the explanation box 36, input of which has been received via the keyboard.

Moreover, in the exemplary embodiment, explanations are automatically inputted in the explanation box 36 to be displayed by the controller 100 corresponding to, for example, the function selected in step 101 or the item set in the step 104. In this specific example, a phone number set as a transmission destination of fax in step 101 is automatically inputted and displayed in the explanation box 36 by the controller 100. At this time, the controller 100 reads the information related to destination associated with the selection button 21 from the memory 105, and displays thereof as the character strings. Then, in the exemplary embodiment, of the explanations displayed in the explanation box, with respect to the character strings automatically inputted by the controller 100, correction and rewriting by a user is prohibited.

It should be noted that, in the creation process of the selection button 21 related to mail transmission, the controller 100 is able to automatically input a mail address to be a destination in the explanation box 36, and, for example, in the creation process of the selection button 21 related to copying, the controller 100 is able to automatically input a number of copies in the explanation box 36.

Moreover, the controller 100 monitors whether or not there exist two or more numbers that successively appear, a hyphen (-) or an at sign (@) in character strings added to the explanation box 36 by a user. In some cases, these characters are used in a function related to distribution as, for example, a destination of facsimile transmission or mail transmission. In the case where this kind of character data is included in the explanations manually inputted by a user, the controller 100 compares the character data with the information regarding the destination read from the memory 105. If both of them do not coincide with each other, the controller 100 determines that erroneous information is included in the contents of the explanations (YES in step 107). As a result, it is possible to suppress presentation of erroneous explanations to a user in the confirmation screen, which will be described later, and also suppress occurrence of erroneous transmission, such as data transmission to unintentional destination.

The preview display part 37 is a part displaying how the selection button 21 to be created is displayed on the home screen as a preview. Specifically, in the preview display part 37, a name manually inputted or automatically inputted by default to the name box 31 and an icon selected by the icon change button 32 or selected by default are displayed by the controller 100.

Moreover, in the case where "YES" is selected on the destination display selection button 33, information regarding the destination of the selected function (a destination display 9F, refer to FIG. 14 to be described later) is displayed in an upper portion of the icon displayed in the preview display part 37. Further, in the case where "YES" is selected on the one-touch operation selection button 34, the rhombus-shaped mark (the reference sign 9E, refer to FIG. 9C) is displayed at down right of the icon displayed in the preview display part 37.

Here, in the case where the information set in the name box 31, the icon change button 32, the destination display selection button 33 or the one-touch operation selection button 34 is changed, the controller 100 of the exemplary embodiment reflects the changed contents in the preview displayed in the preview display part 37 in real time.

Accordingly, it becomes possible for a user who creates the selection button 21 to confirm present settings, and thereby, for example, setting of an unintended icon or name in the selection button 21 to be created can be suppressed.

As described above, the creation completion button 38 is a button for completing creation of the selection button 21. In the case where the creation completion button 38 is selected by a user and there is no erroneous information in the contents of the explanations described in the explanation box 36, the controller 100 causes the memory 105 (refer to FIG. 1) to store the selected function or setting items.

Specifically, in the case where the creation completion button 38 is selected and there is no erroneous information in the contents of the explanations described in the explanation box 36, the controller 100 causes the memory 105 to store the function selected in step 101 or contents of setting items set with respect to the function (a transmission destination of fax, a number of fax transmissions, or the like), information required to create the selection button 21, which has been set or changed in step 104 (a name, icon, explanations or the like) while associating thereof with the selection button 21 to be created.

Figure 13:
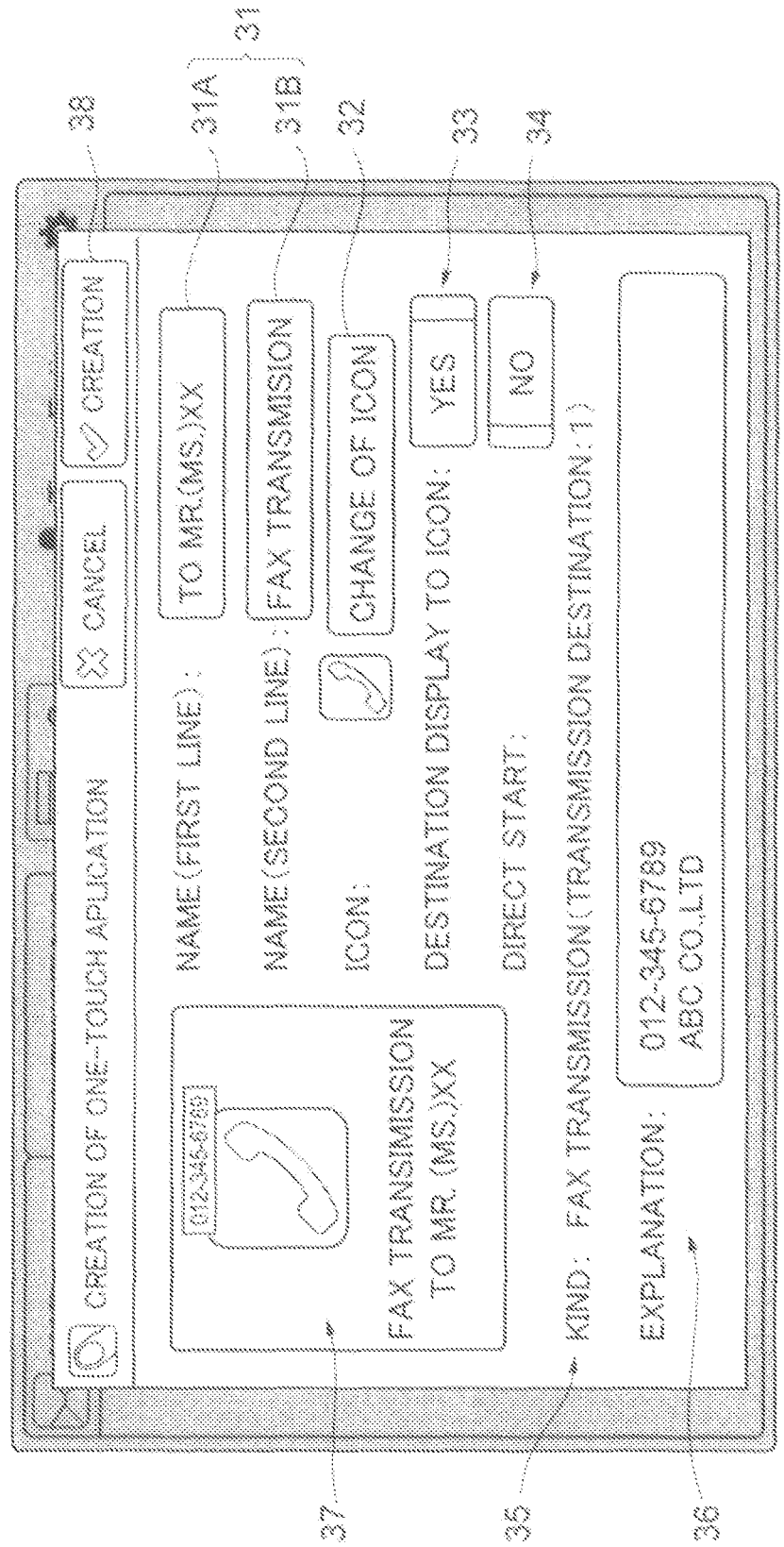
FIG. 13 is a diagram showing a display screen displayed on the display part upon receiving settings by a user in step 104.

FIG. 13 is a diagram showing a display screen (a selection button creation screen) displayed on the display part 107 upon receiving settings by a user in step 104 described above.

In this example, "one-touch" automatically inputted in the first line 31A of the name box 31 in the default state shown in FIG. 12 is rewritten by a user to "to Mr. (or Ms.) XX (XX is a personal name)". It should be noted that the second line of the name box 31 remains as it is in the default state. Moreover, the icon (representing a finger) automatically set in the default state shown in FIG. 12 is changed to another icon (representing a phone receiver) by the user. Further, to the explanation box 36, in addition to a phone number of the transmission destination (012-345-6789) automatically inputted in the default state shown in FIG. 12, another explanation (ABC Co., Ltd.) is added by the user. Then, in the preview display part 37, the preview of the selection button 21 to be created, which has been changed by the above-described changes and additions, is displayed.

It should be noted that, in the image forming apparatus 10 of the exemplary embodiment (refer to FIG. 1), for example, the creation screen of the selection button 21 for each function selected in step 101 is stored in the memory 105. In the case where the creation start button 9A is selected in step 102, the controller 100 reads the creation screen corresponding to the function selected in step 101 and causes the display part 107 to display the creation screen.

Moreover, the creation screen in the case where the fax function is selected is shown in FIG. 12; however, the creation screen in the case where a function other than the fax function is selected also has a configuration basically similar to the creation screen shown in FIG. 12.

That is, similar to the example shown in FIG. 12, the creation screen of a function other than the fax function also includes: the name box 31; the icon change button 32; the one-touch operation selection button 34; the kind display part 35; the explanation box 36; the preview display part 37; and the creation completion button 38.

In contrast thereto, the destination display selection button 33 is displayed only on the creation screen of the function for transferring the data to the outside of the image forming apparatus 10 (refer to FIG. 1), such as the fax function or the mail transmission function, and is not displayed on the creation screen of the function including no transfer function, such as the copy function.

Figure 14:
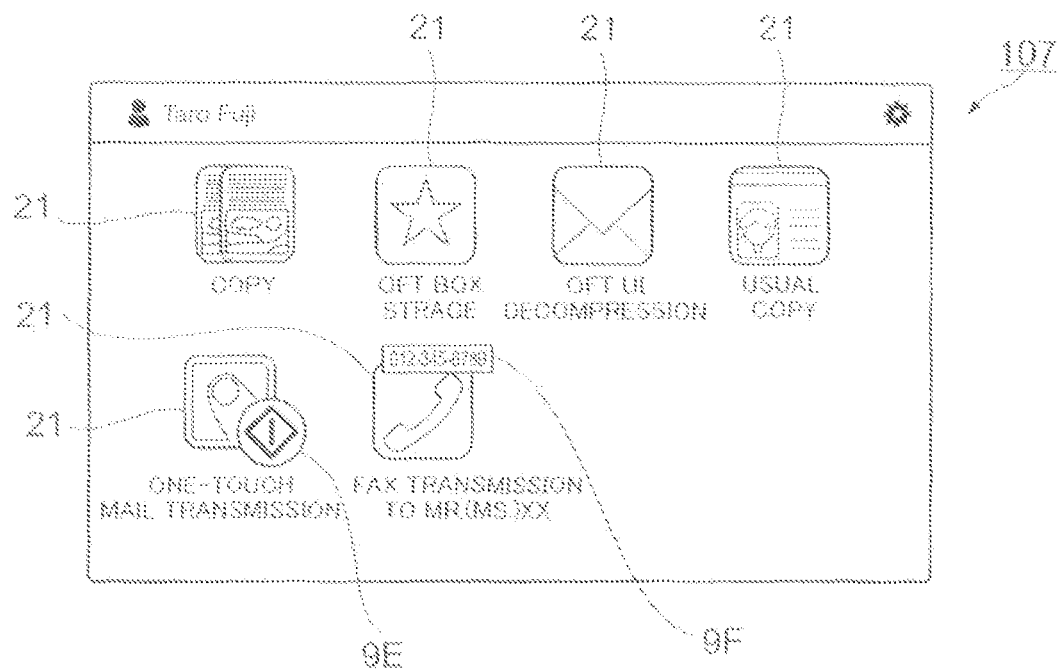
FIG. 14 is a diagram showing a display screen displayed on the display part after completion of a creation process of a selection button for displaying a confirmation screen.

FIG. 14 is a diagram showing a display screen (the home screen) displayed on the display part 107 after completion of the creation process of the selection button 21.

It should be noted that FIG. 14 shows the home screen, which is displayed in the case where the creation completion button 38 is selected in the selection button creation screen shown in FIG. 13.

With the above-described processes, the newly-created selection button 21, with which the fax function is associated (fax transmission to Mr. (or Ms.) XX), is added to the home screen.

Moreover, as shown in FIG. 14, in the exemplary embodiment, in accordance with selection of "YES" on the destination display selection button 33, a destination display 9F is provided and displayed at an upper portion in the icon of the newly-created selection button 21.

Specifically, in displaying the home screen after completing the creation of the selection button 21, based on the information stored in the memory 105 in association with the selection button 21 (the selection result on the destination display selection button 33), the controller 100 determines whether or not the destination display 9F is provided to the selection button 21.

Then, in the case of providing the destination display 9F, the controller 100 reads the information related to the destination associated with the selection button 21 from the memory 105, and causes the display part 107 to display thereof as the destination display 9F.

In this example, as the destination display 9F, the controller 100 reads the phone number, which is the transmission destination of the fax function associated with the selection button 21 from the memory 105, provides the phone number to the icon, and causes the display part 107 to display the phone number.

In this manner, in the case where the function associated with the selection button 21 is the transfer function (the fax transmission, mail transmission or the like), when a user watches the selection button 21, it is possible for the user to confirm the destination by providing the destination display 9F to the icon of the selection button 21 and displaying thereof.

As a result, it is possible to suppress user's selection of the selection button 21 based on misrecognition of the destination associated with the selection button 21, and also suppress data transfer to a destination that is unintended by the user.

It should be noted that, in the example shown in FIG. 14, a phone number, which is a fax transmission destination, is displayed as the destination display 9F; however, the example is not limited thereto. For example, as the destination display 9F, a phone number or a mail address, which is a data transmission destination, may be directly displayed, or a name of a transmission destination or the like, which is stored in the memory 105 corresponding to a phone number or a mail address of the transmission destination, may be displayed.

Incidentally, as described above, the "one-touch selection button 21" created by a user starts the function (the process) associated with the one-touch selection button 21 by merely a single selection operation by the user. In other words, in the case where the one-touch selection button 21 is selected by the user on the home screen, a process is started without displaying an input screen for inputting setting items, such as a transmission destination of fax or a number of copies, or a confirmation screen for confirming these setting items.

This case allows the user to perform the process without selecting the function or inputting the setting items, and thereby provides an effect to save some operations. However, on the other hand, there is a problem as follows.

That is, in the case where a user erroneously selects the one-touch selection button 21 on the home screen, a process is immediately executed even though the process is not intended by the user.

As a result, for example, in a case where a user erroneously selects the one-touch selection button 21, with which a function of transferring data to the outside of the image forming apparatus 10, such as the fax transmission function or the mail transmission function, is associated, there is a possibility that the data is inadvertently transferred to a destination not intended by the user.

Moreover, in a case where a user erroneously selects the one-touch selection button 21, with which a copy function with a large number of copies that involves large consumption of recording materials (sheets) or a scanning function with high resolution that involves large consumption of memory is associated, a large amount of recording materials or memory is inadvertently and wastefully consumed.

Figure 15:
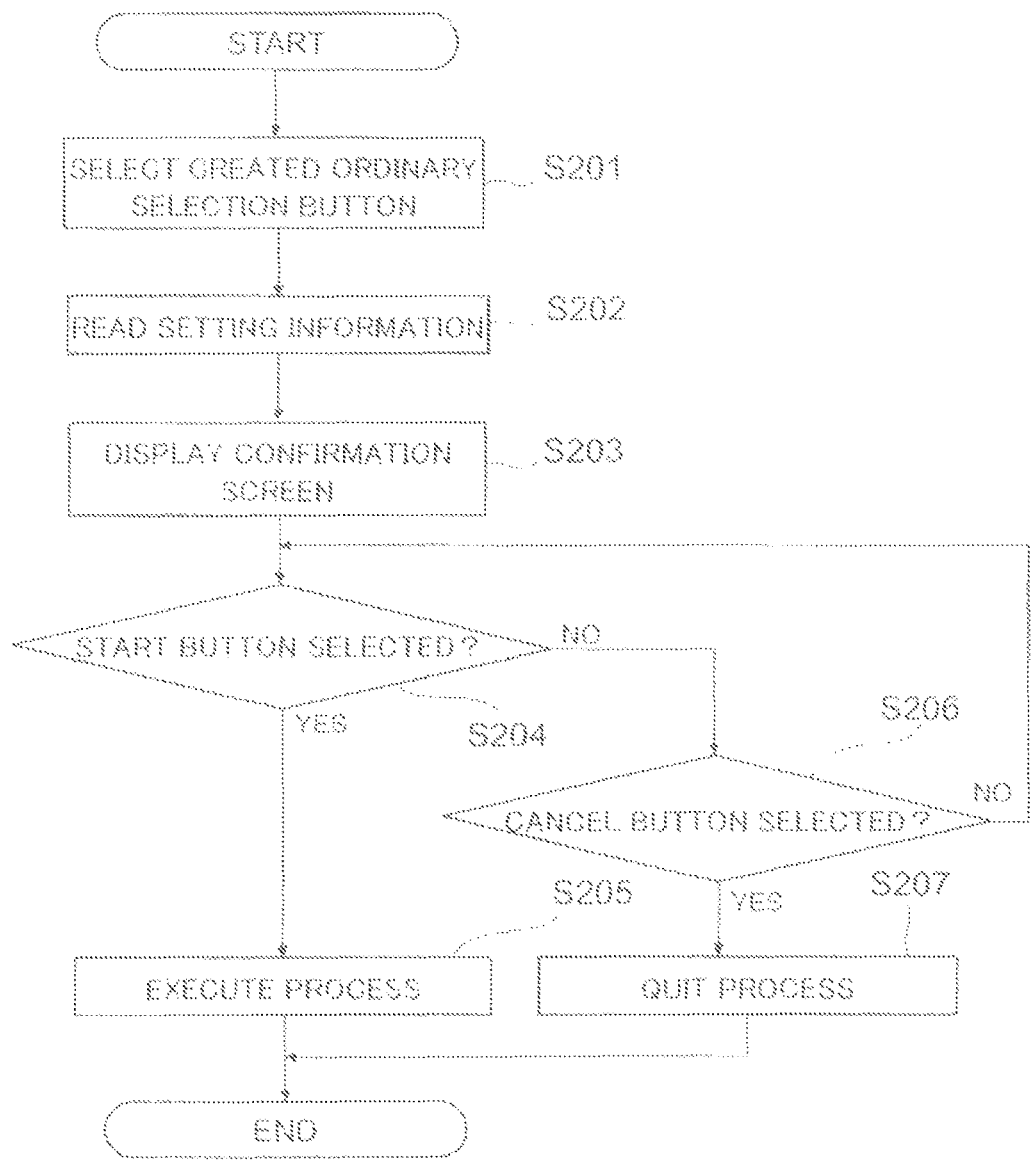
FIG. 15 is a flowchart showing a process executed by the controller when the newly created selection button for displaying the conformation screen is selected.
Figure 16:
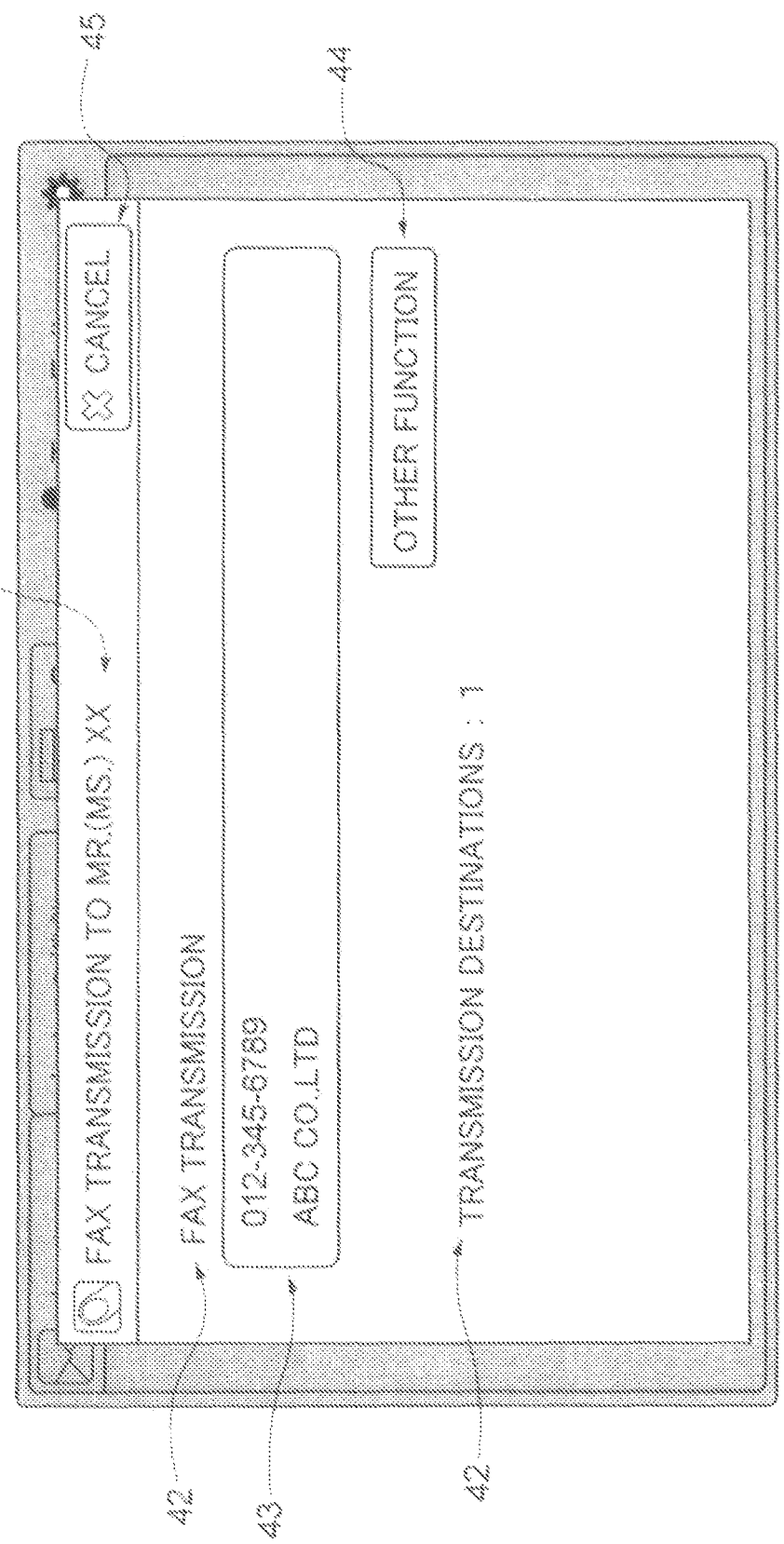
FIG. 16 is a diagram showing a display screen displayed on the display part in step 203.

FIG. 15 is a flowchart showing a process executed by the controller 100 (refer to FIG. 1) when a newly created selection button for displaying the conformation screen is selected. FIG. 16 is a diagram showing a display screen (a confirmation screen) displayed on the display part 107 in the course of the process. It should be noted that, in the following description, the selection button 21 for displaying the confirmation screen is referred to as "created ordinary selection button 21".

Here, description will be given by taking a case, in which a created ordinary selection button 21 shown in FIG. 14 related to a fax function (fax transmission to Mr. (or Ms.) XX) is selected, as an example.

As shown in FIG. 15, when a created ordinary selection button 21 is selected (step 201), the controller 100 reads various kinds of setting information associated with the created ordinary selection button 21 from the memory 105 (step 202). Next, based on the various kinds of setting information having been read, the controller 100 causes the display part 107 to display a confirmation screen of an application including explanations or the like (step 203).

Subsequently, the controller 100 determines whether or not a start button (not shown) provided in the display part 107 is selected by a user (step 204). If it is determined that the start button is selected (YES in step 204), the controller 100 executes a process (an application) based on the various kinds of setting information read in step 202 (step 205).

On the other hand, if it is determined that the start button is not selected (NO in step 204), the controller 100 determines whether or not a cancel button 45 (refer to FIG. 16, which will be described later) displayed in the display part 107 is selected by a user (step 206). If it is determined that the cancel button 45 is not selected (NO in step 206), the controller 100 returns to step 204 to continue the process. In contrast, in the case where it is determined that the cancel button 45 is selected (YES in step 206), the controller 100 quits execution of the process (the application) based on the various kinds of setting information read in step 202 (step 207).

Next, details of a confirmation screen will be described.

FIG. 16 is a diagram showing a display screen (a confirmation screen) displayed on the display part in step 203.

In the confirmation screen, for causing the image forming apparatus 10 by a user to execute a process (an application) associated with a selection button 21, a box for presenting items to be confirmed in advance is displayed.

The confirmation screen shown in FIG. 16 includes: a name presentation part 41 that presents character strings having been inputted in the name box 31 (the first line 31A and the second line 31B) shown in FIG. 13 in creating the selection button 21; a kind presentation part 42 that presents a kind of a function associated with the selection button 21; an explanation presentation part 43 that presents explanations having been inputted in the explanation box 36 in creating the selection button 21; a request receiving button 44 that receives a request for presentation related to functions other than these (other functions); and the cancel button 45 that receives quitting (cancelling) of a process.

It should be noted that, in this specific example, in the confirmation screen, "fax transmission to Mr. (or Ms.) XX" is displayed in the name presentation part 41, "fax transmission" and "transmission destination:1" are displayed in the kind presentation part 42, "012-345-6789" automatically inputted by the controller 100 in the creation process and "ABC Co., Ltd." manually inputted by a user in the creation process are displayed in the explanation presentation part 43. Moreover, in the case where a user selects the request receiving button 44, information, such as "image quality" and "magnification", set by the user in the creation process of the selection button 21 is displayed by use of, for example, a pop-up screen.

In this manner, in the exemplary embodiment, in the case where the selection button 21 created by a user is "created ordinary selection button 21", process is not started by a single inputting operation. In other words, in the case where the created ordinary selection button 21 is selected on the home screen, first, a confirmation screen regarding a function associated with the created ordinary selection button 21 that has been selected is displayed. Then, in the case where the user finalizes execution of a process (an application) in a state where the confirmation screen is displayed (an instruction of execution is received), an actual process is started.

Here, in the exemplary embodiment, the controller 100 functions as a processing unit, a receiving unit, a setting unit and a starting unit, and the display part 107 functions as a display unit. Moreover, in the creation screen shown in FIGS. 12 and 13, the character string manually inputted in the explanation box 36 by a user corresponds to characters, and the character string automatically inputted in the explanation box 36 by the controller 100 corresponds to other characters. Further, the selection button 21 displayed on the home screen on the display part 107 corresponds to a process selection portion. Here, character data is defined by, for example, JIS X0213, and includes various kinds of marks and signs, and further, pictograms, other than the alphanumeric characters and Japanese characters (hiragana, katakana, and kanji-characters).

As described above, in the exemplary embodiment, in the creation process of the selection button 21, explanations regarding a process related to the selection button 21 to be created are manually inputted by a user. Moreover, a set function and setting items including the explanations are stored (registered) in the memory 105 in a state where the set function and the setting items are associated with the newly-created selection button (created ordinary selection button) 21. Then, in the confirmation screen that is displayed when the created ordinary selection button 21 is selected, the explanations manually inputted by the user are displayed. This allows the user to make a selection between execution and quitting of the process after confirming the explanations corresponding to the process associated with the created ordinary selection button 21 (the explanations manually inputted). Therefore, it becomes possible to suppress starting of a process not intended by a user.

Moreover, in the exemplary embodiment, in addition to the explanations manually inputted by a user, explanations automatically inputted by the controller 100 are also displayed in the confirmation screen, which are also stored (registered) in the memory 105 in a state of being associated with a set function. Here, in the exemplary embodiment, the explanations automatically inputted include information such as a destination and a number of copies, prints or transmissions. Accordingly, it becomes possible to further suppress starting of a process not intended by a user.

Further, in the exemplary embodiment, user's correction (editing) of the explanations automatically inputted by the controller 100 is prohibited. Accordingly, it becomes possible to suppress registration of erroneous information.

Still further, in the exemplary embodiment, in the creation process of the selection button 21, it is determined whether or not the erroneous information is included in the contents of the explanations based on comparison of the contents of the explanations manually inputted by a user with information set by the user. Then, in the case where the erroneous information is included in the contents of the explanations, the user is prompted to make re-entry (correction). Accordingly, in the confirmation screen, it is possible to suppress determination of execution or quitting of a process by a user based on erroneous information (explanations).

It should be noted that, in the exemplary embodiment, characters automatically inputted by the controller 100 and characters manually inputted by a user are displayed in a same state in the explanation box 36; however, the way of display is not limited thereto. For example, the characters automatically inputted by the controller 100 may be displayed as solid-white characters, while the characters manually inputted by a user being as usual. Or, the display color (or font) may be changed between the characters automatically inputted by the controller 100 and the characters manually inputted by a user.

Moreover, in the exemplary embodiment, description has been given by taking a case where the selection button 21 related to the fax transmission function (the selection button 21 for displaying the confirmation screen) is created as an example; however, it is possible to create, for example, a selection button 21 related to the copy function (the selection button 21 for displaying the confirmation screen). Such a selection button 21 for displaying the confirmation screen related to the copy function is useful in the case of setting a copy function in which, for example, the number of copies is relatively large (for example, the number of copies of 10 or more).

In the case where the selection button 21 for displaying the confirmation screen related to the copy function, for example, in the explanation box 36 in the creation screen displayed on the display part 107 in step 103 of FIG. 11, the number of copies set in step 101 may be automatically inputted by the controller 100. Then, with respect to the number of copies automatically inputted in the explanation box 36, correction by a user may be prohibited. Moreover, with respect to the character strings manually inputted in the explanation box 36 by a user, for example, manual inputting itself may be prohibited for numeric characters. Or, in the case where manual inputting is performed related to numeric characters, if there is a difference between the numeric characters manually inputted and the number of copies, determination of presence of erroneous information may be made in step 107.

In the case where the selection button 21 for displaying the confirmation screen related to the copy function thus created is selected on the home screen, the controller 100 causes the confirmation screen to be displayed prior to starting a process (an application) related to copying. At this time, the controller 100 causes the confirmation screen to display character strings having been automatically or manually inputted in the explanation box 36 on the creation screen. Then, if a user finalizes execution of the process (the application) (if a not-shown start button is selected) in the where the confirmation screen is displayed, the actual process is started.

Consequently, in the selection button 21 related to the copy function (the selection button 21 for displaying the confirmation screen), similar to the selection button 21 related to the fax function (the selection button 21 for displaying the confirmation screen), it becomes possible to register the explanations manually inputted by a user and the explanations automatically inputted by the controller 100 in association with the selection button 21 to be created.

Moreover, a user is able to make a selection between execution and quitting of a process after confirming the explanations (the explanations manually or automatically inputted) corresponding to the process associated with the selection button 21 for displaying the confirmation screen. Therefore, it becomes possible to suppress starting of a process not intended by a user.

Second Exemplary Embodiment

Subsequently, in a second exemplary embodiment, more detailed description will be given of a process in the case where a selection button 21 as an example of the process selection portion (a one-touch selection button 21 or a selection button 21 for displaying a confirmation screen).

Figure 17:
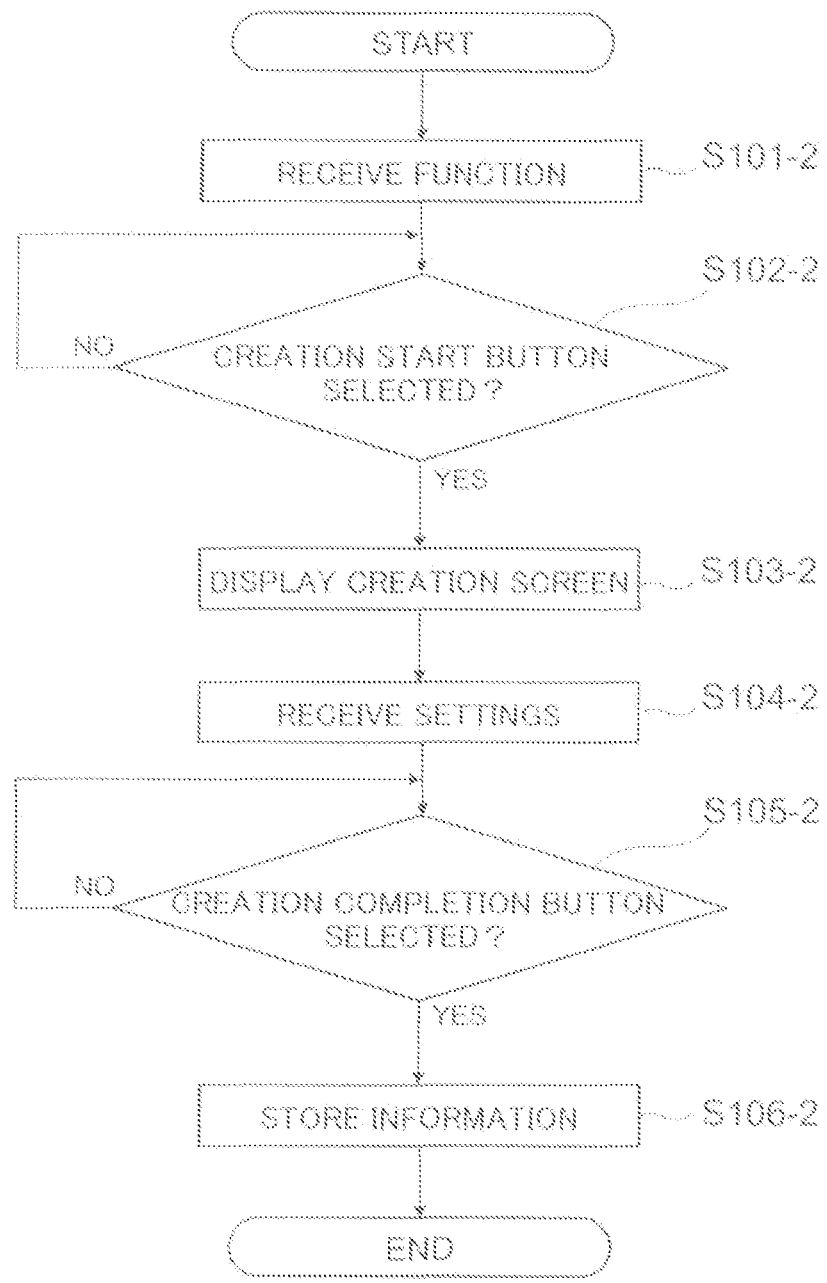
FIG. 17 is a flowchart showing a process executed by the controller in creating the selection button.
Figure 18:
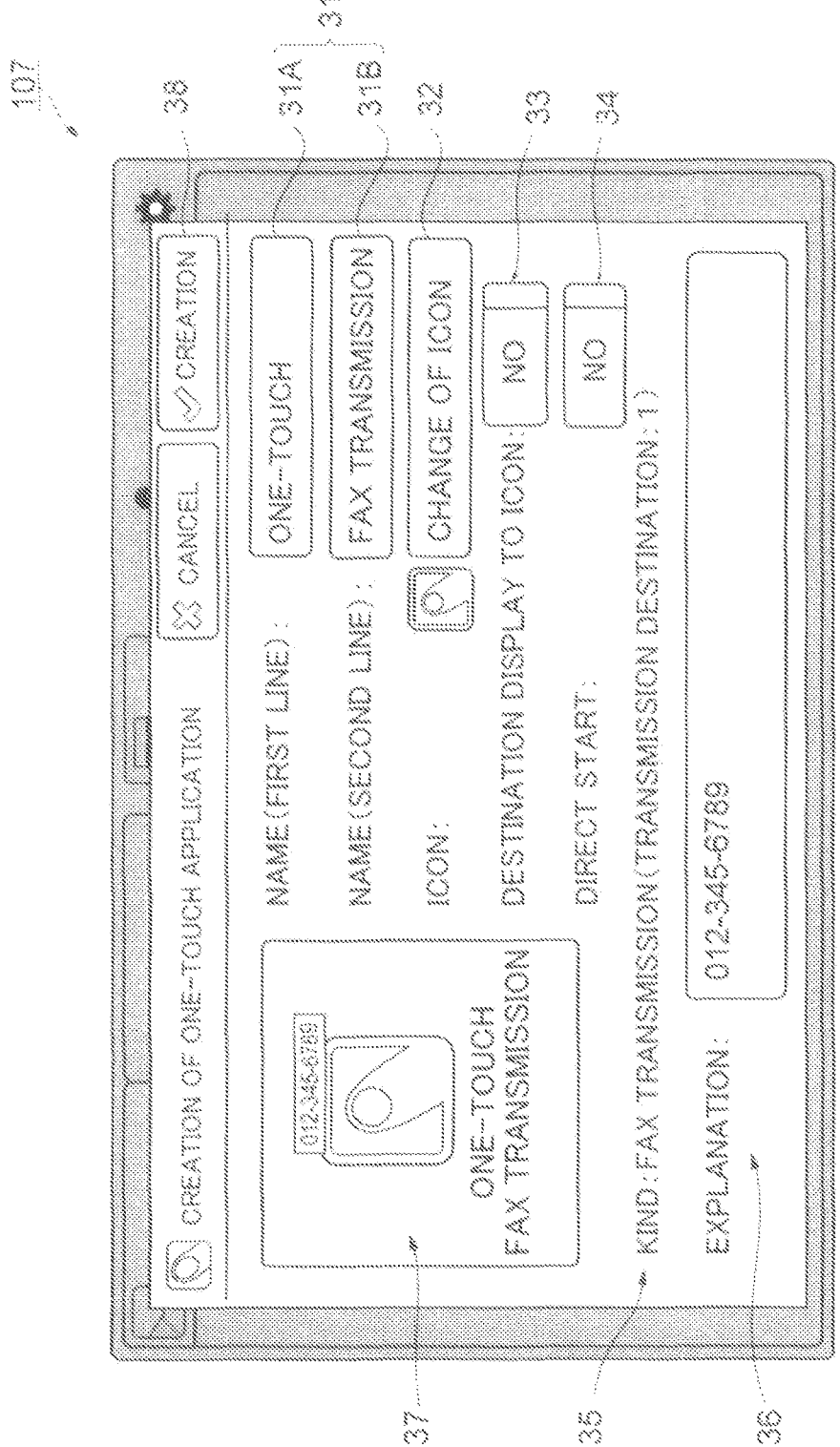
FIG. 18 is a diagram showing a display screen displayed on the display part in creating the selection button.

FIG. 17 is a flowchart showing a process executed by the controller 100 (refer to FIG. 1) in creating a selection button 21. FIG. 18 is a diagram showing a display screen displayed on the display part 107 in creating the selection button 21.

In this specific example, description will be given by taking a case of creating a selection button 21 related to a fax transmission function as an example.

As shown in FIG. 17, when a selection button 21 is to be newly created, the controller 100 receives an input about a function (a process) to be associated with the selection button 21 to be newly created from a user (step 101-2).

Specifically, when the selection button 21 is newly created, the user selects (presses) a selection button 21 representing the function to be associated with the selection button 21 to be newly created on the home screen shown in the above-described FIG. 2. In this specific example, the user first selects a selection button for "fax" on the home screen shown in FIG. 2 described above.

If the selection button 21 is pressed on the home screen, the screen for performing settings about the selected function, which is as shown in FIGS. 3 to 6A and 6B described above, is displayed on the display part 107 by the controller 100.

In this specific example, also in the case where the selection button 21 for "fax" is selected, the screen for performing settings about the fax function is similarly displayed on the display part 107 by the controller 100.

Though detailed description is omitted here, similar to the screen for performing settings about the copy function shown in FIGS. 3 and 4 or the screen for performing settings about the box storage function shown in FIGS. 5, 6A and 6B, the screen for performing settings about the fax function also has a configuration provided with a first tab for displaying setting items that are frequently changed by the user and a second tab for displaying all the setting items in a form of a list.

Then, the user performs settings of each item related to the function associated with the selection button 21 to be newly created by use of the screen displayed in the display part 107. For example, in the case where the copy function is selected, settings, such as "duplex/simplex/bookbinding", "number of copies", "number of N-ups (number of pages aggregated in one page)", "magnification" and "color mode", are performed. Moreover, in the case where the box storage function is selected, settings, such as "color mode", "document feeding mode" and "reading resolution", are performed.

Further, in the case where the fax function is selected, settings, such as "transmission destination", "image quality" and "magnification", are performed. It should be noted that, with respect to "transmission destination", it is possible to set one or more transmission destinations in creating a single selection button 21; however, in this specific example, it is assumed that a single transmission destination is set by the user.

Subsequently, the controller 100 determines whether or not a button for starting creation of a selection button 21 (the gear-shaped mark indicated by the reference sign 9A in FIG. 9A, hereinafter referred to as a creation start button 9A) is selected by a user (step 102-2).

It should be noted that, if the creation start button 9A is not selected (NO in step 102-2), the controller 100 waits until the creation start button 9A is selected.

Next, in the case where it is determined that the creation start button 9A is selected (YES in step 102-2), the controller 100 causes the display part 107 to display a display screen for confirming and changing the contents of settings of the selection button 21 to be newly created (hereinafter referred to as a selection button creation screen, or simply referred to as a creation screen) (step 103-2).

Specifically, the controller 100 causes the display part 107 to display a creation screen corresponding to the function or setting items associated with the selection button 21 to be newly created, which has been inputted by the user in step 101-2. In this specific example, as shown in FIG. 18, a creation screen corresponding to the fax function selected in step 101-2 is displayed on the display part 107.

Subsequently, the controller 100 receives inputs, such as changes in the setting contents related to the selection button 21 to be newly created, in the creation screen (step 104-2).

It should be noted that the details of the creation screen displayed on the display part 107 in step 103-2 or the process in the case where the inputs, such as changes in the setting contents, via the creation screen in step 104-2 will be described in detail later.

Next, the controller 100 determines whether or not a creation completion button 38 that is displayed in the creation screen for completing creation of the selection button 21 has been selected by the user (step 105-2).

It should be noted that, in the case where the creation completion button 38 has not been selected yet (NO in step 105-2), the controller 100 waits until the creation completion button 38 is selected.

If it is determined that the creation completion button 38 has been pressed (YES in step 105-2), the controller 100 causes the memory 105 to store the information, input of which is received in step 101-2 or step 104-2, as information related to the selection button 21 to be created (step 106-2).

With the above description, creation of the selection button 21 is completed.

It should be noted that, in the case where, in step 106-2, it is determined that the creation completion button 38 has been pressed, the controller 100 switches the display screen of the display part 107 to the above-described home screen (refer to FIG. 2). Then, the newly created selection button 21 created by the above-described steps is added to the home screen (refer to FIG. 9C and FIG. 21 to be described later).

Subsequently, details of the creation screen of the one-touch selection button will be described.

In the creation screen of the selection button, buttons or boxes for allowing a user to input information required by the user to create the selection button 21 are displayed.

The creation screen of the selection button shown in FIG. 18 includes: a name box 31 for inputting the name of the selection button 21 to be created (a first line 31A and a second line 31B); an icon change button 32 for changing the design (icon) of the selection button 21 to be created (corresponding to the button indicated by the reference sign 9B in FIG. 9B); a destination display selection button 33 for selecting whether or not destinations are displayed in the icon of the selection button 21 to be created; and a one-touch operation selection button 34 to select the selection button 21 to be created from the one-touch selection button 21 and the selection button 21 for displaying the confirmation screen.

Further, the creation screen of the selection button includes: a kind display part 35 for displaying a kind of a function associated with the selection button 21 to be created; an explanation box 36 for inputting explanations related to the selection button 21 to be created; a preview display part 37 for displaying a state of the selection button 21 to be created when the selection button 21 is displayed on the home screen; and the creation completion button 38 for completing creation of the selection button 21.

Here, as described above, the name box 31 is a box for inputting a name to be displayed on the display screen (the home screen) together with the icon of the selection button 21, and is divided into two lines, namely, the first line 31A and the second line 31B.

In the exemplary embodiment, in the name box 31 in a default state that is initially displayed by the controller 100 on the display part 107 when the creation start button 9A is selected in step 102-2, a name related to the function inputted in step 101-2 is inputted in advance. In this example, corresponding to the fax function inputted in step 101-2, "one-touch" is inputted in the first line 31A, and "fax transmission" is inputted in the second line 31B of the name box 31.

In the exemplary embodiment, a user is able to change the name inputted in the name box 31. Specifically, when the user presses the name box 31 (the first line 31A and the second line 31B), a keyboard screen (not shown) is displayed on the display part 107 by the controller 100. The user is able to input an arbitrary name to the name box 31 by use of the displayed keyboard.

The icon change button 32 is a button selected by a user when the icon of the selection button 21 to be created is changed. Moreover, on the left side in the figure of the icon change button 32, an icon that is presently set is displayed. In the exemplary embodiment, in the default state initially displayed on the display part 107, an icon predetermined by the controller 100 is set, and is displayed on the left side in the figure of the icon change button 32.

Though details will be described later, when the icon change button 32 is selected by the user, an icon selection screen in which plural icons are arranged is displayed on the display part 107 by the controller 100. Then, by selecting an icon from the icon selection screen, the user is able to change the icon of the selection button 21 to be created.

The destination display selection button 33 is a slide-type button having a knob that is movable to the right or left, and is able to make selection between "YES" and "NO" by sliding the knob to the right or left.

It should be noted that the destination display selection button 33 is displayed in the case where, for example, the function selected in step 101-2 includes a function of transferring data (facsimile transmission or mail transmission) to the outside of the image forming apparatus 10 (refer to FIG. 1).

Though details will be described later, in the case where "YES" is selected on the destination display selection button 33, information regarding the destination of the function associated with the selection button 21 is displayed together with the icon of the selection button 21 displayed on the home screen.

It should be noted that, in the exemplary embodiment, in the default state of the creation screen initially displayed on the display part 107, the destination display selection button 33 is set as "YES". Consequently, in the case where the user does not operate the destination display selection button 33, the destination is displayed together with the icon of the selection button 21. As a result, as long as the user does not carry out an operation of changing the setting to "NO" in the creation screen, the destination is set to be notified to the user, and accordingly, it is possible to suppress occurrence of erroneous transmission, such as transmitting data to an unintended destination, as compared to the case where the destination display selection button 33 is set to "NO" in the creation screen in the default state.

In the example shown in FIG. 18, "NO" is selected on the destination display selection button 33.

The one-touch operation selection button 34 is, similar to the destination display selection button 33, configured with a slide-type button, it is possible to make a selection between "YES" and "NO" by sliding the knob to the right or left.

Here, in the case where "YES" is selected on the one-touch operation selection button 34, the selection button 21 to be created becomes "one-touch selection button 21" that starts a process by only a single selection of the selection button 21. In this case, as described above, the icon of the selection button 21 displayed on the home screen is provided with the rhombus-shaped mark (the reference sign 9E, refer to FIG. 9C).

On the other hand, in the case where "NO" is selected on the one-touch operation selection button 34, the selection button 21 to be created becomes "selection button 21 for displaying confirmation screen". In this case, the rhombus-shaped mark 9E is not added to the icon of the selection button 21 displayed on the home screen.

It should be noted that, different from the one-touch selection button 21, the selection button 21 for displaying the confirmation screen is a selection button 21 that does not start a process by a single inputting operation (one touch). In other words, in the case where the selection button 21 for displaying the confirmation screen is selected on the home screen, prior to executing a process associated with the selection button 21 for displaying the confirmation screen, the confirmation screen for confirming the setting contents of the function associated with the selection button 21 for displaying the confirmation screen is displayed on the display part 107. Thereafter, in the case where, for example, execution of the process is finalized by the user, the process is started.

Here, in the exemplary embodiment, in the creation screen in the default state initially displayed in the display part 107, the one-touch operation selection button 34 is set to "NO". Consequently, if the user does not carry out an operation on the one-touch operation selection button 34, the selection button 21 to be created becomes "selection button 21 for displaying confirmation screen". As a result, the setting is made so that, as long as the user does not carry out changing to "YES" in the creation screen, the selection button 21 to be created does not become the one-touch selection button 21. Accordingly, it is possible to suppress unintentional creation of "one-touch selection button 21", and also suppress execution of an unintentional process caused by erroneous selection of the one-touch selection button 21 by the user, as compared to the case where "YES" is set in the default state.

In the specific example shown in FIG. 18, "NO" is selected on the one-touch operation selection button 34.

The kind display part 35 displays a kind of the function associated with the selection button 21 to be created. The contents displayed in the kind display part 35 are set by the controller 100 in accordance with the function selected in step 101-2, and are incapable of being changed by a user.

As described above, since it is possible for a user to change the icon or name of the selection button 21 to be created, there are some cases in which the icon or name of the selection button 21 is changed by a user to those irrelevant to the selected function. In this case, by watching icons or names irrelevant to the function in selecting the function, there is a possibility that a user has misrecognition regarding the function associated with the selection button 21. Consequently, in the exemplary embodiment, the kind of the function associated with the selection button 21 is displayed in the kind display part 35 for suppressing occurrence of such inconveniences.

In the example shown in FIG. 18, the characters "fax transmission" corresponding to the fax function selected in step 101-2 and "(transmission destination: 1)" corresponding to the number of transmission destinations set in step 104-2 are displayed in the kind display part 35 by the controller 100.

The explanation box 36 is a box for inputting explanations regarding the selection button 21 to be created. A user is able to input arbitrary explanations to the explanation box 36. Specifically, when a user presses the explanation box 36, a keyboard screen (not shown) is displayed on the display part 107 by the controller 100. The user is able to input explanations by use of the keyboard. Then, the controller 100 displays the explanations in the explanation box 36, input of which has been received via the keyboard.

Moreover, in the exemplary embodiment, there are some cases in which explanations are automatically inputted in the explanation box 36 to be displayed by the controller 100 corresponding to, for example, the function selected in step 101-2 or the item set in the step 104-2. In this example, a phone number set as a transmission destination of fax in step 101-2 is automatically inputted and displayed in the explanation box 36 by the controller 100.

The preview display part 37 is a part displaying how the selection button 21 to be created is displayed on the home screen as a preview. Specifically, in the preview display part 37, a name inputted, or inputted by default to the name box 31 and an icon selected by the icon change button 32 or selected by default are displayed by the controller 100.

Moreover, in the case where "YES" is selected on the destination display selection button 33, information regarding the destination of the selected function (a destination display 9F, refer to FIG. 21 to be described later) is displayed in an upper portion of the icon. Further, in the case where "YES" is selected on the one-touch operation selection button 34, the rhombus-shaped mark (the reference sign 9E, refer to FIG. 9C) is displayed at down right of the icon displayed in the preview display part 37.

Here, in the case where the information set in the name box 31, the icon change button 32, the destination display selection button 33 or the one-touch operation selection button 34 is changed, the controller 100 of the exemplary embodiment reflects the changed contents in the preview displayed in the preview display part 37 in real time.

Accordingly, it becomes possible for a user who creates the selection button 21 to confirm present settings, and thereby, for example, setting of an unintended icon or name in the selection button 21 to be created can be suppressed.

As described above, the creation completion button 38 is a button for completing creation of the selection button 21. In the case where the creation completion button 38 is selected by a user, the controller 100 causes the memory 105 (refer to FIG. 1) to store the selected function or setting items.

Specifically, in the case where the creation completion button 38 is selected, the controller 100 causes the memory 105 to store the function selected in step 101-2 or contents of setting items set with respect to the function (a transmission destination of fax, a number of fax transmissions, or the like), information required to create the selection button 21, which has been set or changed in step 104-2 (a name, icon, explanations or the like) while associating thereof with the selection button 21 to be created.

It should be noted that, in the image forming apparatus 10 of the exemplary embodiment (refer to FIG. 1), for example, the creation screen of the selection button 21 for each function selected in step 101-2 is stored in the memory 105. In the case where the creation start button 9A is selected in step 102-2, the controller 100 reads the creation screen corresponding to the function selected in step 101-2 and causes the display part 107 to display the creation screen.

Moreover, the creation screen in the case where the fax function is selected is shown in FIG. 18; however, the creation screen in the case where a function other than the fax function is selected also has a configuration basically similar to the creation screen shown in FIG. 18.

That is, similar to the example shown in FIG. 18, the creation screen of a function other than the fax function also includes: the name box 31; the icon change button 32; the one-touch operation selection button 34; the kind display part 35; the explanation box 36; the preview display part 37; and the creation completion button 38.

In contrast thereto, the destination display selection button 33 is displayed only on the creation screen of the function for transferring the data to the outside of the image forming apparatus 10 (refer to FIG. 1), such as the fax function or the mail transmission function, and is not displayed on the creation screen of the function including no transfer function, such as the copy function.

Incidentally, as described above, the "one-touch selection button 21" created by a user starts the function (the process) associated with the one-touch selection button 21 by merely a single selection operation by the user. In other words, in the case where the one-touch selection button 21 is selected by the user on the home screen, a process is started without displaying an input screen for inputting setting items, such as a transmission destination of fax or a number of copies, or a confirmation screen for confirming these setting items.

This case allows the user to perform the process without selecting the function or inputting the setting items, and thereby provides an effect to save some operations. However, on the other hand, there is a problem as follows.

That is, in the case where a user erroneously selects the one-touch selection button 21 on the home screen, a process is immediately executed even though the process is not intended by the user.

As a result, for example, in a case where a user erroneously selects the one-touch selection button 21, with which a function of transferring data to the outside of the image forming apparatus 10, such as the fax transmission function or the mail transmission function, is associated, there is a possibility that the data is inadvertently transferred to a destination not intended by the user.

Moreover, in a case where a user erroneously selects the one-touch selection button 21, with which a copy function with a large number of copies that involves large consumption of recording materials (sheets) or a scanning function with high resolution that involves large consumption of memory is associated, a large amount of recording materials or memory is inadvertently and wastefully consumed.

Further, in the case where the selection button 21 created by a user is "selection button 21 for displaying confirmation screen", a process is not started by a single inputting operation. In other words, in the case where the selection button 21 for displaying the confirmation screen is selected on the home screen, first, a confirmation screen about a function associated with the selection button 21 for displaying the confirmation screen having been selected. Then, in the case where a user finalizes execution of the process in this confirmation screen, the process is started.

However, with such a selection button 21 for displaying the confirmation screen, an input screen for inputting setting items, such as a destination of fax transmission and a number of copies, is not displayed. Accordingly, since a user is not required to perform an operation of inputting setting items related to a process to be executed, even if the setting items are displayed on the confirmation screen, there are some cases where the user finalizes execution of the process without proper confirmation.

In this case, there is a possibility of generating a problem similar to the case of erroneously selecting the above-described "one-touch selection button 21".

By the way, in executing a process in the image forming apparatus 10, a user selects a selection button 21 corresponding to the process to be executed, for example, from plural selection buttons 21 displayed on the home screen aided by an icon, a name and the like displayed corresponding to each selection button 21.

Accordingly, in the case where an icon displayed corresponding to the selection button 21 on the screen evokes a function different from the function associated with the selection button 21, for example, there is a possibility that a user erroneously selects the selection button 21 with misrecognition that the selection button 21 is associated with the function evoked by the icon.

In this case, it is feared that a process not intended by a user is executed, as described above.

In contrast, in the exemplary embodiment, during the course of the process of creating the above-described selection button 21, icons selectable by a user is limited when the icon change button 32 (refer to FIG. 18) is selected. This suppresses creation of a selection button 21 provided with an icon that evokes a function different from an associated function, and suppresses erroneous selection of a selection button 21 not intended by a user on the home screen.

Subsequently, detailed description will be given of a process in the case where an icon is changed, which is executed when the icon change button 32 (refer to FIG. 18) is selected in step 104-2 shown in FIG. 17.

Figure 19:
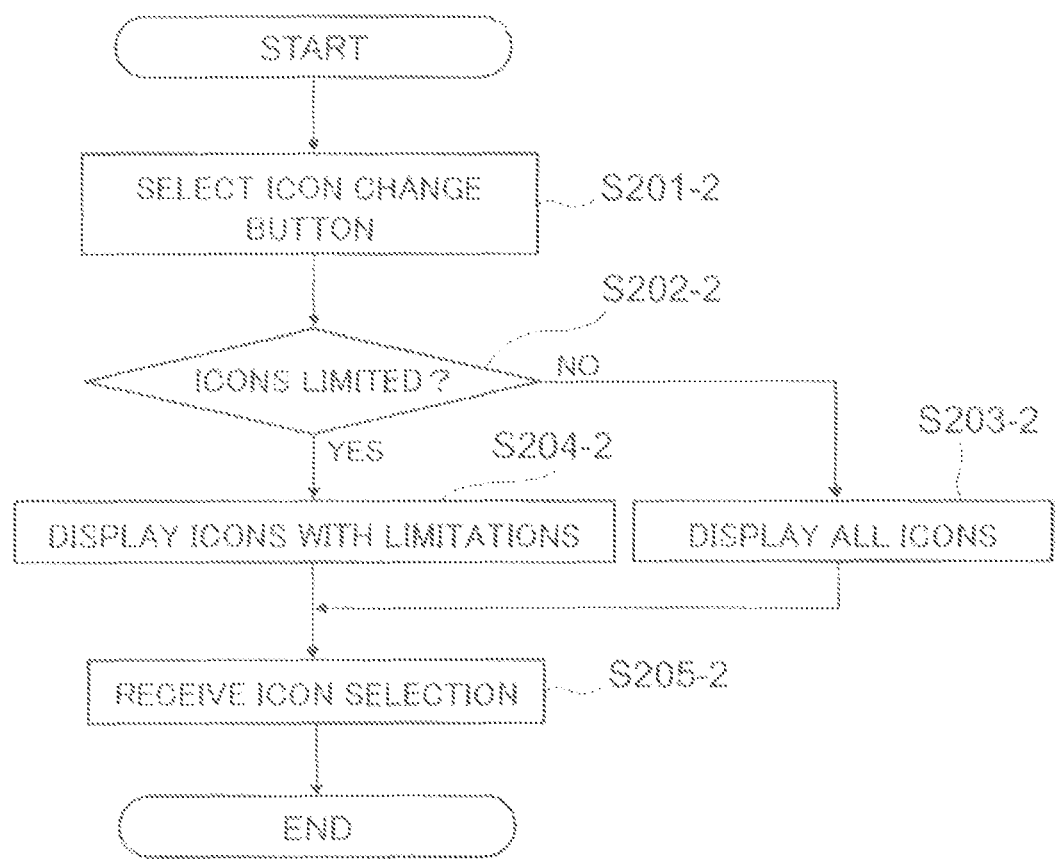
FIG. 19 is a flowchart showing a process executed by the controller in a case where an icon change button is selected.
Figure 20A:
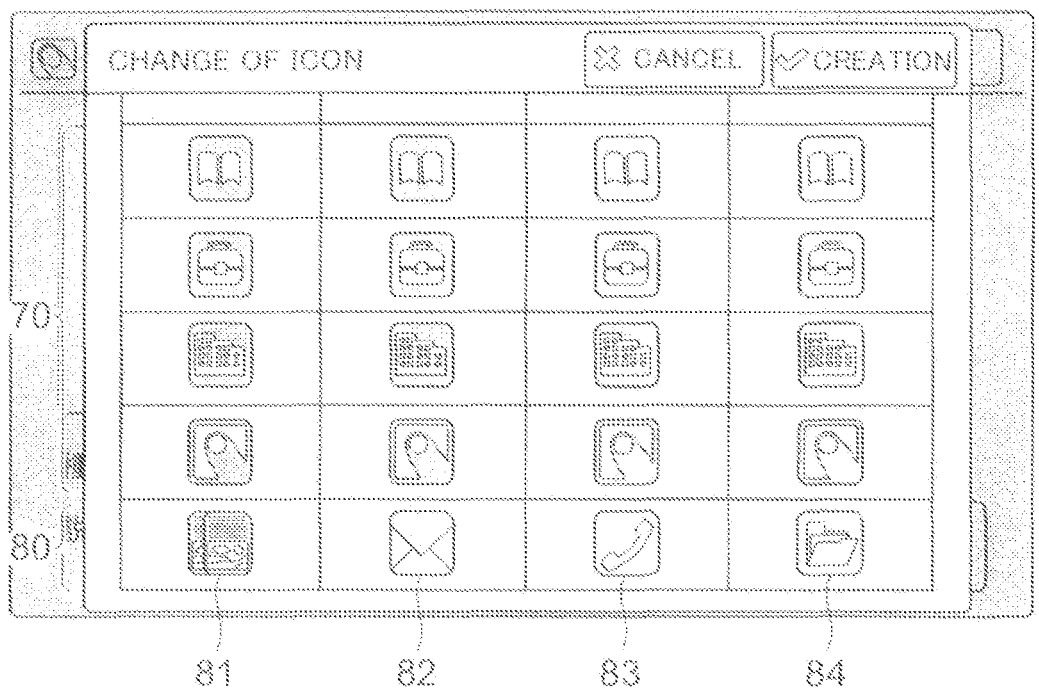
FIGS. 20A and 20B are diagrams showing examples of an icon selection screen displayed in a case where the icon change button is selected.
Figure 20B:
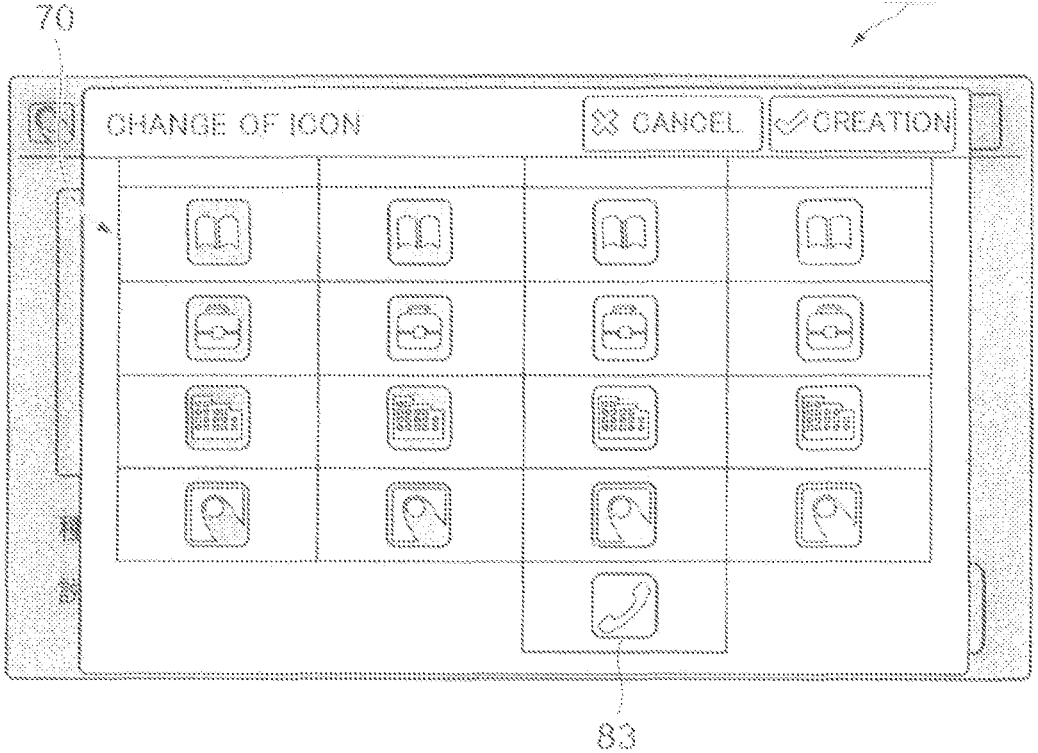

FIG. 19 is a flowchart showing a process executed by the controller 100 in the case where the icon change button 32 is selected. Moreover, FIGS. 20A and 20B are diagrams showing examples of an icon selection screen displayed in the case where the icon change button 32 is selected.

First, in the case where the icon change button 32 is selected (step 201-2), the controller 100 determines whether or not the icons selectable by a user are limited, based on the function to be associated with the selection button 21 to be created or setting items of the function, input of which has been received in step 101-2 (refer to FIG. 17) as described above (step 202-2).

When the controller 100 determines in step 202-2 whether or not the selectable icons are limited, for example, whether or not the function selected in step 101-2 is the transfer function, whether or not the function selected in step 101-2 involves large consumption of recording materials or memory capacity, and the like can be taken as criteria.

Specifically, the controller 100 determines that the selectable icons are limited, for example, in the case where the functions selected in step 101-2 includes a function transferring data to the outside of the image forming apparatus 10 (refer to FIG. 1) (such as a mail transmission function, a fax transmission function and a box storage function provided with the transfer function), a function involving large consumption of recording materials or memory capacity (such as a case in which, in the copy function, the number of copies is larger than a predetermined value, and a case in which, in the scanning function, image reading is performed at a resolution higher than a predetermined value) (YES in step 202-2). On the other hand, in the case where the selected function is not a function for transferring data or a function involving large consumption of recording materials or memory capacity, the controller 100 determines that the selectable icons are not limited (NO in step 202-2).

It should be noted that these criteria for determining whether or not the selectable icons are limited are stored, for example, in the memory 105. Then, the controller 100 determines whether or not the selectable icons are limited by comparing these criteria stored in the memory 105 with the functions or setting items, selection of which has been received through the display part 107 in step 101-2.

Moreover, these criteria for determining whether or not the selectable icons are limited may be, for example, changed by a user, or a new criterion may be set by a user.

If it is determined that the selectable icons are not limited (NO in step 202-2), the controller 100 causes the display part 107 to display the icon selection screen in which all icons are arranged (step 203-2). FIG. 20A shows the icon selection screen in the case where the icons to be displayed are not limited and all icons are displayed.

In the icon selection screen shown in FIG. 20A, all icons that are able to be set to the selection button 21 are arranged in a lattice pattern to be displayed.

Here, in the exemplary embodiment, the plural icons displayed in the icon selection screen include sixteen abstract icons 70 configured with images not evoking processes executed by the image forming apparatus 10 and four process icons 80 configured with images evoking some of the processes executed by the image forming apparatus 10.

In the process icons 80 in the exemplary embodiment, a copy icon 81 that evokes the copy function, a mail icon 82 that evokes the mail function, a fax icon 83 that evokes the fax function and a box storage icon 84 that evokes the box storage function are included, all these process icons 80 are displayed in the icon selection screen shown in FIG. 20A.

Here, all of these plural icons (the abstract icons 70 and the process icons 80) are stored in the memory 105. Moreover, of these plural icons, each of the process icons 80 is stored in association with the function evoked by the process icon 80. Specifically, the copy icon 81, the mail icon 82, the fax icon 83 and the box storage icon 84 are stored in association with the copy function, the mail function, the fax function and the box storage function, respectively.

Then, when the icon selection screen is displayed, based on the determination result in step 202-2, the function set in step 101-2 and the function associated with the process icon 80, the controller 100 selects an icon to be displayed from all of the icons and reads thereof from the memory 105, and causes the display part 107 to display the icon.

In the example shown in FIG. 20A, in which it is determined that the selectable icons are not limited in step 202-2, the controller 100 selects and reads all of the icons stored in the memory 105 (the abstract icons 70 and the process icons 80), and causes the display part 107 to display all of the icons.

Subsequently, in the case where it is determined that the selectable icons are limited in step 202-2 (YES in step 202-2), the controller 100 imposes a limitation on the icons to be displayed on the display part 107 (step 204-2). FIG. 20B shows an example of the icon selection screen in the case where the icons to be displayed are limited.

In the case where it is determined that the selectable icons are limited in step 202-2, the controller 100 causes the display part 107 not to display the icons that evoke functions different from the function associated with the selection button 21 selected in step 101-2 (refer to FIG. 17) (in this specific example, the fax function).

Specifically, based on the function set in step 101-2 and the function associated with the process icon 80, the controller 100 selects and reads the process icon 80 associated with the function set in step 101-2 from all of the icons, namely, all of the abstract icons 70 and process icons 80, stored in the memory 105, and causes the display part 107 to display the process icon 80.

In this specific example, as shown in FIG. 20B, the controller 100 causes the display part 107 to display, of the process icons 80, only the fax icon 83 associated with the fax function set in step 101-2, and not to display the copy icon 81, the mail icon 82 and the box storage icon 84 that are associated with functions different from the fax function.

Moreover, the controller 100 does not impose a limitation on the display of the abstract icons 70, to thereby cause the display part 107 to display all of the abstract icons 70.

Subsequently, from the plural icons displayed as the icon selection screen, the controller 100 receives selection of an icon after the change by a user (step 205-2), and completes the process of icon changing.

Here, in the case where the controller 100 determines not to limit the selectable icons in step 202-2, since all of the icons stored in the memory 105 are displayed in the display part 107, a user is able to select an icon to be associated with the selection button 21 from all of the icons stored in the memory 105.

In contrast, in the case where it is determined that the controller 100 imposes a limitation on the icons in step 202-2, a user selects an icon to be associated with the selection button 21 from all of the abstract icons 70 and the process icons 80 evoking the function associated with the selection button 21 displayed in the display part 107. In other words, a user is not able to select the process icons 80 evoking functions different from the function associated with the selection button 21 as the icon to be associated with the selection button 21.

It should be noted that, after receiving user's icon selection, the creation screen of the selection button 21 shown in FIG. 18 is displayed again on the display part 107 by the controller 100. Moreover, in this case, the changed icon selection of which has been received in step 205-2 is newly displayed in the preview display part 37 by the controller 100.

Thereafter, when the creation completion button 38 is selected by a user, the controller 100 stores the changed icon in the memory 105 together with other setting items.

Here, in the exemplary embodiment, a creation unit that creates the selection button 21, a selection receiving unit that receives selection of an icon (design) provided to the selection button 21, and a limiting unit that disables selection of a design related to a process different from a process associated to the selection button 21 are embodied by the controller 100.

It should be noted that, in the exemplary embodiment, in step 202-2, the controller 100 determines whether or not a limitation is imposed on the icons selectable by a user based on the function or setting items selected in step 101-2; however, the limitation may be always imposed on the icons selectable by a user irrelevant to the function or setting items selected in step 101-2.

Moreover, in the exemplary embodiment, in the case where the limitation is imposed on the icons, the icons on which limitation is imposed not to be selected have not been displayed on the icon selection screen; however, the way of limitation is not limited thereto. For example, it may be possible to configure so that the icons on which limitation is imposed are displayed on the icon selection screen, and then selection of the icons is not received, or, it may also be possible to display the icons on which limitation is imposed in different colors. Moreover, it may be possible to provide notification on the icon selection screen that the icons on which limitation is imposed cannot be selected. Further, it may also be possible to cause a user to get an error until the creation of the selection button 21 is completed, although the icon has been selected.

In the present invention, "limitation" may be a configuration in which a selection button 21 by use of any of the icons on which limitation is imposed is not finally created, and "permission" may be a configuration in which a selection button 21 is finally created with any of available icons.

It should be noted that, as shown in FIG. 18 described above, in the creation screen in the default state initially displayed in the display part 107 by the controller 100, of all the icons stored in the memory 105, any of the abstract icons 70 is selected and displayed. Accordingly, in the case where a user does not perform an operation on the icon change button 32 in the creation screen, the abstract icon 70 is selected as an icon of the selection button 21 to be created.

As a result, even in the case where a user does not perform an operation on the icon change button 32, provision of a process icon 80 that evokes a function different from the associated function to the selection button 21 is suppressed.

Subsequently, description will be given of a new selection button 21, which is additionally displayed on the home screen on the display part 107 (the display unit) by the controller 100 after the creation completion button 38 is pressed in the above-described step 106-2 (refer to FIG. 17).

Figure 21:
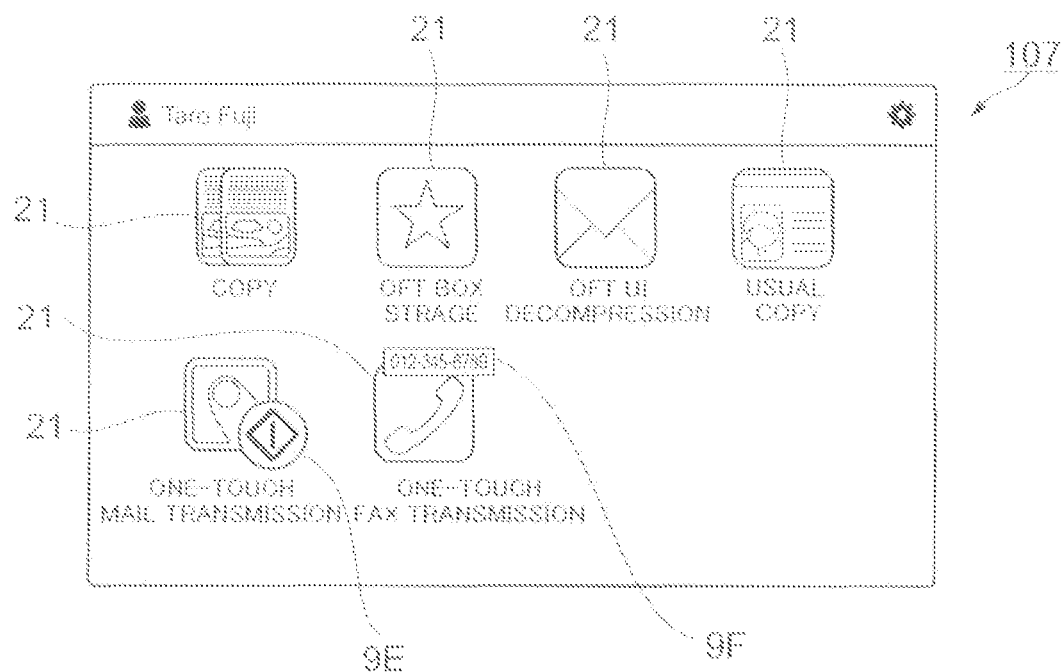
FIG. 21 is a diagram showing an example of a display screen (a home screen) displayed on the display part by the controller after completion of creation of the selection button.

FIG. 21 is a diagram showing an example of the display screen (the home screen) displayed on the display part 107 by the controller 100 after completion of creation of the selection button 21.

It should be noted that, in FIG. 21, the home screen is shown, which is displayed in the case where the destination display selection button 33 is changed to "YES" and the icon is changed to the fax icon 83 (refer to FIGS. 20A and 20B) by the icon change button 32, and thereafter, the creation completion button 38 is selected in the creation screen of the selection button 21 shown in FIG. 18.

As shown in FIG. 21, in the exemplary embodiment, as the selection button 21 with which the fax function is associated, the fax icon 83 that evokes the fax function is displayed.

In this manner, in the case where a process icon 80 (refer to FIG. 20A) that evokes a function associated with the selection button 21 is displayed as the selection button 21, when a user sees this selection button 21, he or she rarely thinks of a function different from the function associated with the selection button 21.

As a result, in the image forming apparatus 10 (refer to FIG. 1), it is possible to suppress user's misrecognition that a function, which is different from a function actually associated with a selection button 21, is associated with the selection button 21, to thereby suppress erroneous selection of the selection button 21. As a result, in the image forming apparatus 10, execution of a process not intended by a user can be suppressed.

Further, though illustration will be omitted, in the case where an abstract icon 70 (refer to FIG. 20A) is selected in the above-described icon selection screen, the abstract icon 70 is displayed as the selection button 21 on the home screen.

Here, as described above, any function executed in the image forming apparatus 10 is hardly evoked from the abstract icons 70. Accordingly, it is possible to suppress user's misrecognition that a function, which is different from a function actually associated with a selection button 21, is associated with the selection button 21, to thereby suppress erroneous selection of the selection button 21. As a result, in the image forming apparatus 10, execution of a process not intended by a user can be suppressed.

Moreover, as shown in FIG. 21, in the exemplary embodiment, in response to selection of "YES" on the destination display selection button 33, the destination display 9F is provided to an upper portion of the selection button 21 to be displayed.

Specifically, in displaying the home screen after completion of creation of the selection button 21, the controller 100 determines whether or not the destination display 9F is provided to the selection button 21 based on the information stored in the memory 105 in association with the selection button 21 (the selection result on the destination display selection button 33).

Then, in the case where the destination display 9F is provided, the controller 100 reads the information related to the destination associated with the selection button 21 from the memory 105, and causes the display part 107 to display the information as the destination display 9F.

In this specific example, as the destination display 9F, the controller 100 reads a phone number, which is a transmission destination of the fax function associated with the selection button 21, from the memory 105, and causes the display part 107 to provide the phone number to the icon to be displayed.

In this manner, in the case where the function associated with the selection button 21 is a transfer function (such as fax transmission and mail transmission), by providing the destination display 9F to the icon of the selection button 21 and displaying thereof, when a user sees the selection button 21, the destination is able to be confirmed.

As a result, user's selection of the selection button 21 with misrecognition of the destination associated with the selection button 21 is suppressed, and accordingly, data transfer to a destination not intended by the user is suppressed.

It should be noted that, in the example shown in FIG. 21, a phone number, which is a transmission destination of fax is displayed as the destination display 9F; however, the destination display 9F is not limited thereto. For example, as the destination display 9F, a phone number or a mail address, which is a transmission destination of data, may be displayed as it is, or, a name of a transmission destination stored in the memory 105 corresponding to a phone number or a mail address of the transmission destination may be displayed.

Incidentally, in the image forming apparatus 10 (refer to FIG. 1) of the exemplary embodiment, as described above, it is possible to select a box storage function as a function associated with the selection button 21. Then, in the case of associating the box storage function with the selection button 21, further, as an attribute of the box storage (hereinafter, referred to as a box attribute), it is possible to associate the transfer function, such as fax or mail, with the selection button 21.

In the case where, as the box attribute, the transfer function is associated with the selection button 21, with which the box storage function has been associated, when data is stored in a box by selecting this selection button 21, the fax function or the mail function is automatically executed and the stored data is transferred to the outside of the image forming apparatus 10.

Moreover, in the exemplary embodiment, in the case where the selection button 21 with which a box attribute, such as a transfer function, is associated is created, a user is able to change the box attribute on the home screen or the like. Specifically, a user is able to change a kind of the transfer function to be associated as the box attribute (such as fax or mail) or a destination in the transfer function.

Further, in the image forming apparatus 10 of the exemplary embodiment, a user is also able to associate, on the home screen or the like, a new box attribute with a selection button 21 with which the box storage function has been associated.

Here, in the case where, for example, plural users use the image forming apparatus 10, there are some cases in which, while a user is unnoticed, a box attribute associated with a selection button 21 is changed or a new box attribute is associated with a selection button 21 by another user.

Then, in the case where the user is not notified that the box attribute of the selection button 21 is changed or the new box attribute is associated with the selection button 21, there is a possibility that the user selects the selection button 21 while having misrecognition of the box attribute associated with this selection button 21. In this case, a transfer function or the like not intended by the user is apt to be executed.

In contrast, in the exemplary embodiment, in the case where the selection button 21, with which the box storage function is associated, is created, and further, the box attribute associated with the selection button 21 is changed or the new box attribute is associated with the selection button 21, it is possible to call user's attention by displaying a warning on the display part 107.

Figure 22:
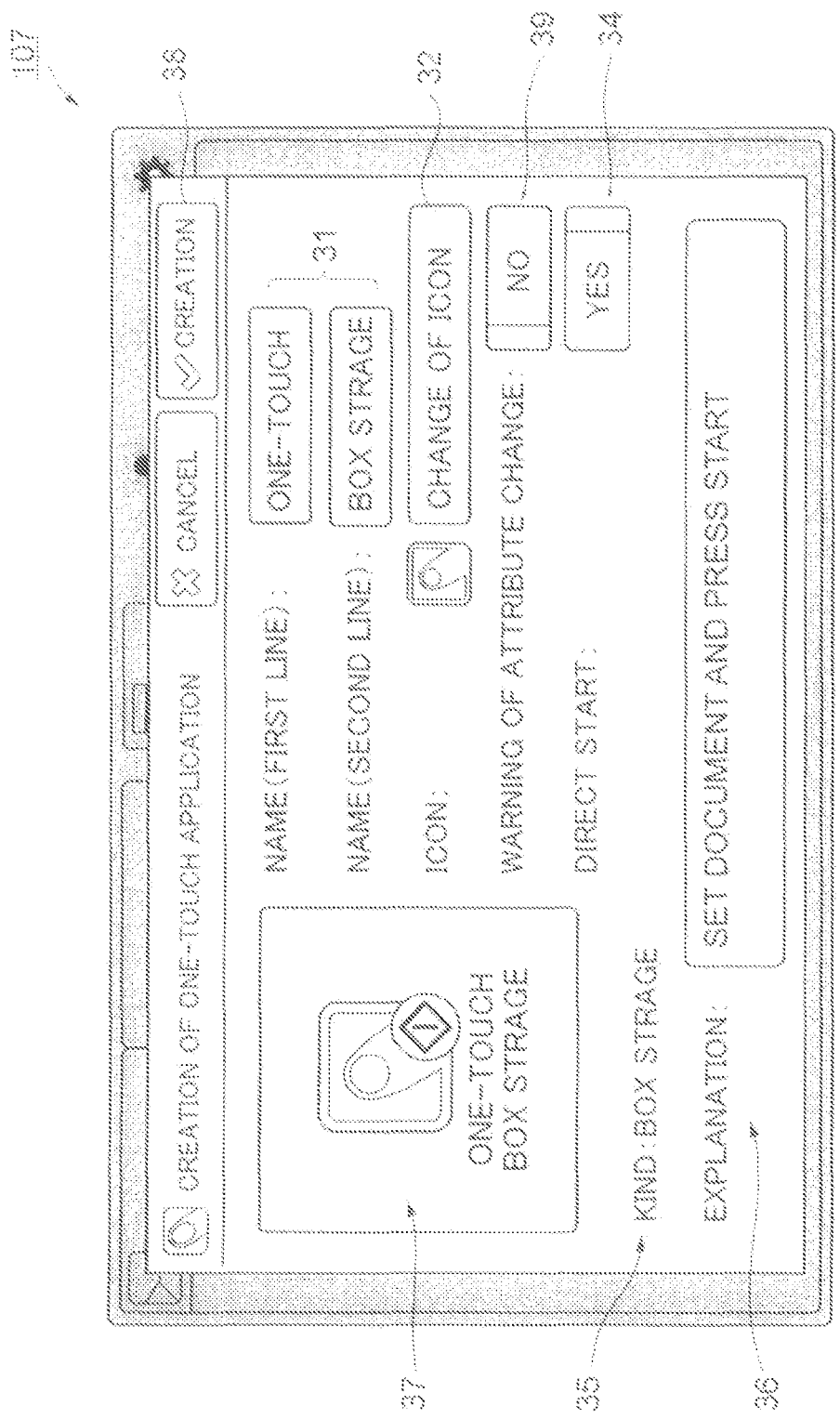
FIG. 22 is a diagram showing an example of a creation screen displayed in creating a selection button with which a box storage function is associated.

FIG. 22 is a diagram showing an example of a creation screen displayed in creating a selection button 21 with which a box storage function is associated.

In the exemplary embodiment, in the case where a box storage function is selected as a function to be associated with a selection button 21 in the above-described step 101-2 (refer to FIG. 17), the controller 100 displays the creation screen shown in FIG. 22 on the display part 107.

In the creation screen shown in FIG. 22, in addition to the above-described name box 31, icon change button 32, one-touch operation selection button 34, kind display part 35, explanation box 36 and preview display part 37, a warning display selection button 39 is displayed.

The warning display selection button 39 is, similar to the one-touch operation selection button 34, configured with a slide-type button, and thereby a user is able to make a selection between "YES" and "NO" by sliding a knob to the left or right.

In the case where "YES" is selected on the warning display selection button 39, as will be described later, a warning is displayed on the home screen or the like when a box attribute of the selection button 21 is changed or a new box attribute is associated with the selection button 21.

On the other hand, in the case where "NO" is selected on the warning display selection button 39, the warning is not displayed.

It should be noted that, in the example shown in FIG. 22, "NO" is selected on the warning display selection button 39.

Here, in the case where the creation completion button 38 is selected in a state where "YES" is selected on the warning display selection button 39, the controller 100 stores the box attribute set in step 101-2 (if no box attribute is set, that effect) in the memory 105. It should be noted that the box attribute stored in the memory 105 here is, as will be described later, used as a criterion in determining whether or not a warning is made on the home screen. In the following description, the box attribute stored in the memory 105 and used as the criterion for issuing warning or not is sometimes referred to as a reference box attribute.

It should be noted that, in the case where the creation completion button 38 is selected in a state where "NO" is selected on the warning display selection button 39, the reference box attribute is not stored.

Subsequently, a description will be given of a process executed in a case where the box attribute associated with the selection button 21 is changed, and a display screen displayed on the display part 107 in issuing a warning in the case where the box attribute is changed or the like.

Figure 23A:
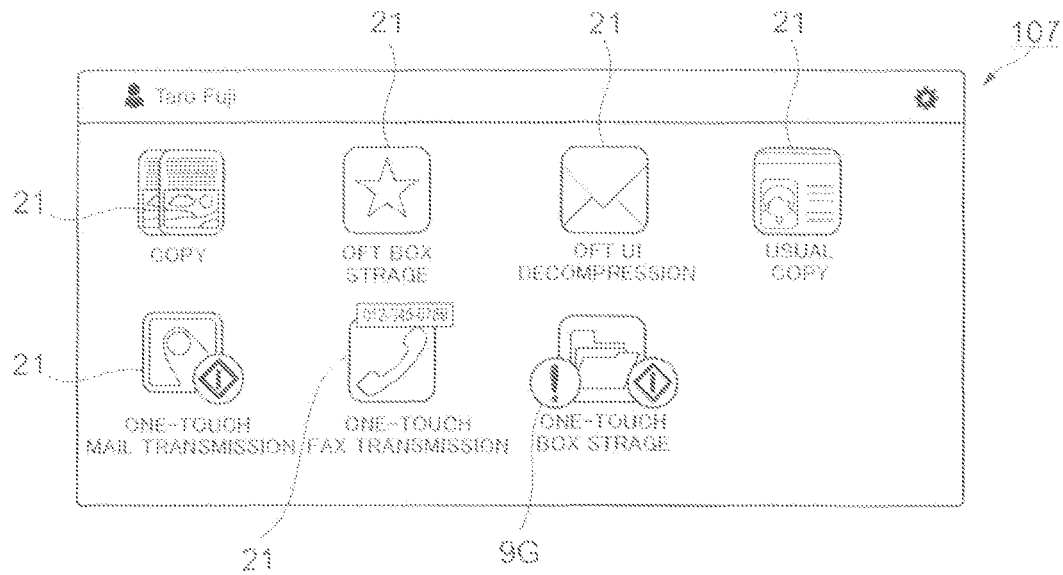
Figure 23B:
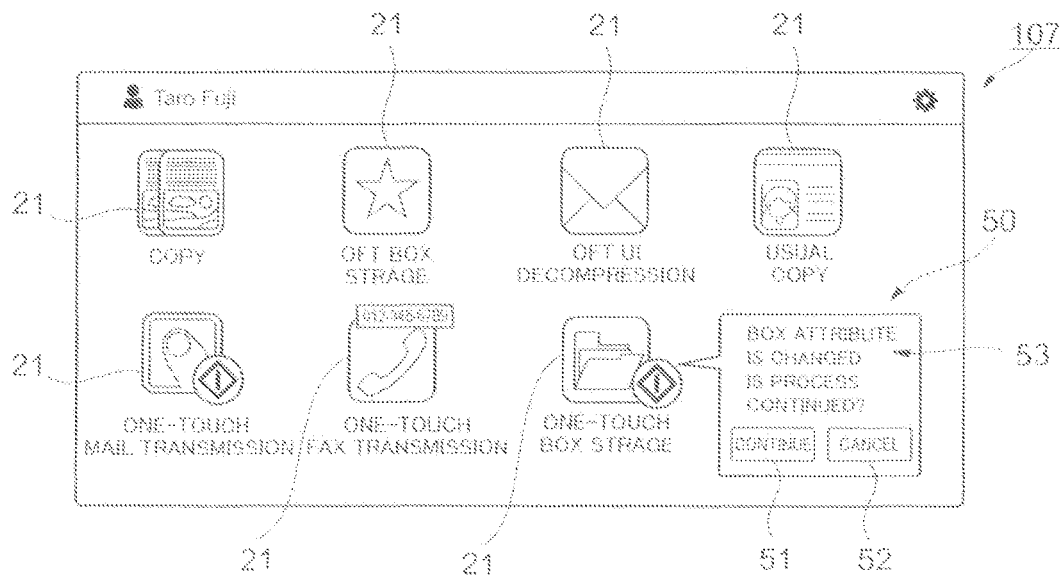

FIGS. 23A and 23B are diagrams showing an example of the display screen displayed on the display part 107 when a warning is issued in the case where the box attribute is changed or the like.

First, as shown in FIG. 23A, a description will be given of a first example, in which a mark that means a warning (hereinafter, referred to as a warning mark 9G) is provided to the icon of the selection button 21 displayed on the home screen, to thereby display a warning.

Figure 24:
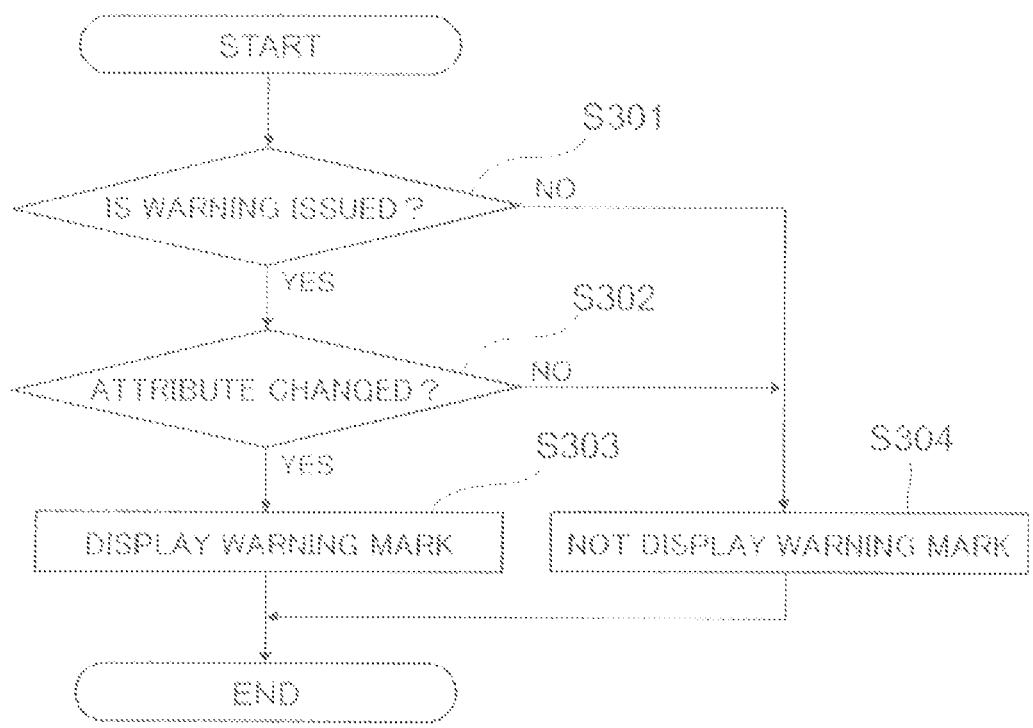
FIG. 24 is a flowchart showing a process executed by the controller in performing warning display in a first example.

FIG. 24 is a flowchart showing a process executed by the controller 100 in performing warning display in the first example.

When the home screen is displayed on the display part 107 after the selection button 21, with which the box storage function is associated, is created, the controller 100 determines whether or not a warning issuing is selected based on the information stored in the memory 105 in association with the selection button 21 (step 301).

Subsequently, in the case where selection is made to issue a warning (YES in step 301), the controller 100 compares the box attribute presently associated with the selection button 21 with the reference box attribute stored in the memory 105 (step 302).

Here, the reference box attribute refers to the box attribute stored in the memory 105 in association with the selection button 21 when the selection button 21 is created, as described above. Moreover, in the case where the selection button 21 is selected and the process is executed after the selection button 21 is created, the reference box attribute is updated and the box attribute when the process is executed is stored as a new reference box attribute.

Then, if the box attribute presently associated with the selection button 21 is different from the reference box attribute (YES in step 302), the controller 100 issues a warning on the home screen displayed in the display part 107 (step 303).

Specifically, as shown in FIG. 23, when the home screen is displayed, the controller 100 provides the warning mark 9G to the icon associated with the selection button 21, and causes the display part 107 to display the icon provided with the warning mark 9G.

On the other hand, in the case where a selection is made not to issue a warning (NO in step 301), and in the case where the box attribute presently associated with the selection button 21 is equal to the reference box attribute (NO in step 302), the controller 100 displays the icon associated with the selection button 21 without providing the warning mark 9G (step 304).

Subsequently, a description will be given of a second example, in which a warning is issued by displaying a pop-up display 50 on the display part 107 when the selection button 21 is selected on the home screen by a user to execute a process (box storage), as shown in FIG. 23B.

Figure 25:
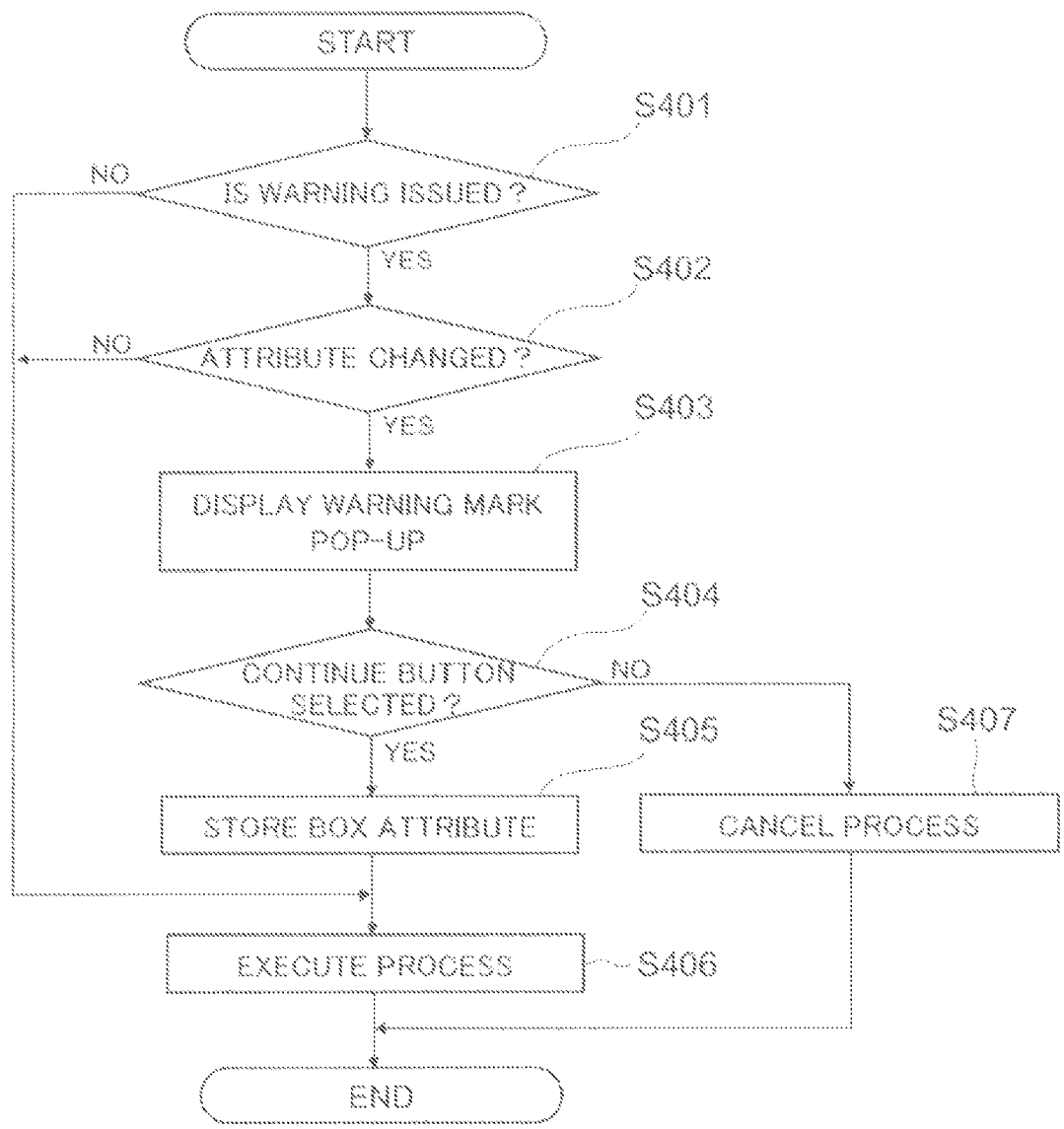
FIG. 25 is a flowchart showing a process executed by the controller in performing warning display in a second example.

FIG. 25 is a flowchart showing a process executed by the controller 100 in performing warning display in the second example.

In the case where the selection button 21 is selected on the home screen by a user, the controller 100 determines whether or not a warning issuing is selected based on the information stored in the memory 105 in association with the selection button 21 (step 401).

Subsequently, in the case where selection is made to issue a warning (YES in step 401), the controller 100 compares the box attribute presently associated with the selection button 21 with the reference box attribute stored in the memory 105 (step 402).

Then, if the box attribute presently associated with the selection button 21 is different from the reference box attribute (YES in step 402), the controller 100 issues a warning on the home screen displayed in the display part 107 (step 403).

Specifically, as shown in FIG. 23B, the controller 100 displays a pop-up display 50 on the home screen. It should be noted that, in the pop-up display 50, as shown in FIG. 23B, a sentence 53 for notifying a user of the warning, a continue button 51 for determining to continuously execute a process and a cancel button 52 for determining to cancel a process are displayed.

Subsequently, the controller 100 determines whether or not the continue button 51 in the pop-up display 50 is selected (step 404).

In the case where the continue button 51 is selected (YES in step 404), the controller 100 causes the memory 105 to store the box attribute associated with the selection button 21 as a new reference box attribute, and updates the reference box attribute (step 405).

Then, the controller 100 executes the process associated with the selection button 21 (step 406), to thereby complete a series of processes.

On the other hand, in the case where the continue button 51 in the pop-up display 50 is not selected, namely, in the case where the cancel button 52 is selected (NO in step 404), the controller 100 cancels the execution of the process associated with the selection button 21 (step 407), to thereby complete a series of processes. It should be noted that, in the case where execution of the process is cancelled, the controller 100 does not update the reference box attribute.

It should be noted that, in the selection button 21, in the case where a selection is made not to issue a warning (NO in step 401) and in the case where the box attribute presently associated with the selection button 21 is equal to the reference box attribute (NO in step 402), the controller 100 executes the process associated with the selection button 21 (step 406), to thereby complete a series of processes.

In this manner, in the exemplary embodiment, in the case where the selection button 21, with which the box storage function is associated, is created, a warning is displayed on the display part 107 if the box attribute associated with the selection button 21 is changed, or, if a new box attribute is associated with the selection button 21.

This allows a user to recognize on the display part 107 that the box attribute associated with the selection button 21 is changed, or a new box attribute is associated with the selection button 21.

As a result, it is possible to suppress user's misrecognition of the box attribute associated with the selection button 21, and also suppress execution of a process not intended by the user (the transfer function) in the image forming apparatus 10 (refer to FIG. 1).

Further, in the second example shown in FIG. 23B, in the case where the box attribute is changed, it is possible to cancel execution of a process even after the selection button 21 is selected. Accordingly, even though a user selects the selection button 21 with misrecognition of the box attribute associated with the selection button 21, it is possible to suppress execution of a process not intended by the user in the image forming apparatus 10.

Here, the method of issuing a warning to a user is not limited to the first example shown in FIG. 23A or the second example shown in FIG. 23B. Moreover, a warning may be issued by combining plural warning methods, such as using the first example and the second example together.

Further, selection of the warning methods may be configured, for example, to be set or changed by a user.

Moreover, in the above-described examples, the description has been given of the process of displaying a warning in the case where the box storage function is associated with the selection button 21 and the box attribute is changed; however, the warning is issued not only in this case. Even in the case where the process associated with the selection button 21 is a function other than the box storage function, a warning may be issued if, for example, contents of the function associated with the selection button 21 (such as a number of copies, image quality and transmission destinations of mail or the like) are changed.

It should be noted that, in the exemplary embodiment, a processing unit is configured with, for example, the image forming part 109, the communication part 110, the controller 100 and the memory 105.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
   at least one processor configured to execute:
      a processing unit that performs a process;
      a display unit that displays a process selection portion, with which the process performed by the processing unit is associated and which is configured to be selected to start the processing unit performing the process;
      a receiving unit that receives input of a character in a case of creating the process selection portion to be displayed by the display unit; and
      a creation unit that creates the process selection portion and associates the received character with the process selection portion;
   wherein, after the creation unit has created the process selection portion, if the process selection portion displayed in the display unit is selected, then the display unit displays the character in a confirmation screen for confirming settings of the process to be performed by the processing unit,
   wherein the displayed character is not displayed before the process selection portion is selected, and
   wherein the displayed character is associated with the process selection portion by the creation unit.

2. The processing apparatus according to claim 1, wherein, if the process selection portion is selected, after causing the display unit to display the associated character, then the processing unit receives an instruction to execute the process associated with the process selection portion, and thereafter, starts the process.

3. The processing apparatus according to claim 1, wherein the at least one processor is further configure to execute:
   a setting unit that sets another character if the process selection portion is created,
   wherein the creation unit associates the another character set by the setting unit with the process selection portion.

4. The processing apparatus according to claim 3, wherein the receiving unit prohibits correction of the another character set by the setting unit.

5. The processing apparatus according to claim 1, wherein the at least one processor is further configured to execute:
   a determination unit that determines whether or not the character received by the receiving unit includes an error,
   wherein, if the determination unit determines that the character includes the error, then the receiving unit receives correction of the character.

6. The processing apparatus according to claim 1, wherein the at least one processor is further configured to execute:
   a selection receiving unit that receives selection of a design; and
   a limiting unit that, if the process selection portion is created by the creation unit, then limits association of a predetermined design, of a plurality of designs registered in advance, with the process selection portion,
   wherein the design is displayed in the display unit as the process selection portion.

7. The processing apparatus according to claim 6, wherein the limiting unit disables selection of a design, of the plurality of designs, related to a process different from the process associated with the process selection portion.

8. The processing apparatus according to claim 6, wherein the selection receiving unit receives selection of a design from, of the plurality of designs, at least one of a group of designs related to a process associated with the process selection portion and a group of designs not related to any process executed by the processing unit.

9. The processing apparatus according to claim 6, wherein the processing unit performs a transmission process that transmits an image data to be processed by the processing unit to a predetermined transmission destination, and if the process associated with the process selection portion is the transmission process, then the limiting unit disables selection of a design related to a process different from the transmission process.

10. The processing apparatus according to claim 6, wherein the processing unit performs a transmission process that transmits an image data to be processed by the processing unit to a predetermined transmission destination, and if the transmission process is associated with the process selection portion created by the creation unit, then the display unit adds information related to the transmission destination of the transmission process to the design selected by the selection receiving unit and displays the design and the information.

11. The processing apparatus according to claim 6, wherein, if processing contents by the processing unit are changed after the process selection portion is created, then the display unit displays a warning.

12. The processing apparatus according to claim 6, wherein the design includes a predetermined design, of the plurality of designs registered in advance except for a part thereof, and the predetermined design is displayed in the display unit as the process selection portion.

13. The processing apparatus according to claim 1, wherein, after the creation unit has created the process selection portion, in response to the process selection portion displayed in the display unit being selected, the display unit displays the character in the confirmation screen for confirming settings of the process to be performed by the processing unit.

14. A processing apparatus comprising:
at least one processor configured to execute:
- a processing unit that performs a process;
- a display unit that displays a process selection portion, with which the process performed by the processing unit is associated and which is configured to be selected to start the processing unit performing the process;
- a receiving unit that receives input of a character if a new process selection portion is created as the process selection portion displayed by the display unit; and
- a starting unit that, if the process selection portion created and displayed in the display unit is selected, after causing the display unit to display the character with the process selection portion in a confirmation screen for confirming settings of the process to be performed by the processing unit, then receives an instruction to execute the process associated with the process selection portion, and thereafter, starts the processing unit performing the process.

15. A display device comprising:
at least one processor configured to execute:
- a display unit that displays a process selection portion, with which a process performed by a processing unit is associated and which is configured to be selected to start the processing unit performing the;
- a selection receiving unit that receives selection of a design;
- a creation unit that, in a case of creating the process selection portion to be displayed by the display unit, creates the process selection portion and associates the design with the process selection portion; and
- a limiting unit that, if the process selection portion is created by the creation unit, then limits association of a predetermined design, of a plurality of designs registered in advance, with the process selection portion,
wherein the design is displayed in the display unit as the process selection portion.

16. A non-transitory computer readable medium storing a program that causes a computer to execute operations comprising:
performing a process;
displaying, in a display unit, a process selection portion, with which the process is associated and which is confirmed to be selected to start the performing the process;
receiving input of a character in the case of creating the process selection portion to be displayed the display unit; and,
creating the process selection portion and associating the received character with the process selection portion,
wherein, after the creating the process selection portion, if the process selection portion displayed in the display unit is selected, then the display unit displays the character in a confirmation screen for confirming settings of the process to be performed,
wherein the displayed character is not displayed before the process selection portion is selected, and
wherein the displayed character is associated with the process selection portion.

17. The non-transitory computer readable medium storing a program according to claim 16, wherein the operations further comprise:
receiving selection of a design; and
if the process selection portion is created by a creation unit, then limiting association of a predetermined design, of a plurality of designs registered in advance, with the process selection portion,
wherein the design is displayed as the process selection portion in the display unit.

18. A non-transitory computer readable medium storing a program that causes a computer to execute operations comprising:
displaying, in a display unit, a process selection portion, with which a process to be performed by a processing unit is associated and which is configured to be selected to start the processing unit performing the process;
receiving input of a character, if a process selection portion is created, as the process selection portion to be displayed by the display unit; and
if the process selection portion created and displayed in the display unit is selected, after causing the display unit to display the character in a confirmation screen for confirming settings of the process to be performed by the processing unit, then receiving an instruction to execute the process associated with the process selection portion, and thereafter, starting the processing unit performing the process.

* * * * *